United States Patent
Kadowaki

(10) Patent No.: US 6,674,547 B1
(45) Date of Patent: *Jan. 6, 2004

(54) IMAGE PROCESSING APPARATUS FOR PERFORMING IMAGE FORMATION USING SIGNALS OBTAINED BY PULSE-WIDTH MODULATING AN IMAGE SIGNAL BY A PLURALITY OF MODULATING METHODS

(75) Inventor: Toshihiro Kadowaki, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/587,503

(22) Filed: Jan. 17, 1996

(30) Foreign Application Priority Data

Jan. 18, 1995 (JP) .............................. 7-005813

(51) Int. Cl.⁷ ................................. H04N 1/40
(52) U.S. Cl. ...................... 358/3.01; 347/188
(58) Field of Search .................. 382/309; 358/298, 358/296, 300, 1.9, 2.1, 521, 523, 530, 533, 3.02, 3.01; 347/132, 135, 144, 252, 131, 188

(56) References Cited

U.S. PATENT DOCUMENTS

| | | | |
|---|---|---|---|
| 4,847,654 A | 7/1989 | Honma et al. | 358/300 |
| 4,870,499 A | 9/1989 | Suzuki et al. | 358/443 |
| 4,980,757 A | 12/1990 | Nishigaki | 358/75 |
| 5,021,876 A | 6/1991 | Kurita et al. | 358/75 |
| 5,029,227 A | 7/1991 | Kawamura | 382/54 |
| 5,113,252 A * | 5/1992 | Horie et al. | 358/451 |
| 5,124,802 A | 6/1992 | Ito et al. | 358/298 |
| 5,157,417 A | 10/1992 | Anzai | 346/108 |
| 5,187,495 A | 2/1993 | Tanimoto et al. | 346/108 |
| 5,251,023 A * | 10/1993 | Arimoto et al. | 358/529 |
| 5,315,382 A | 5/1994 | Tanioka | 358/523 |
| 5,321,531 A * | 6/1994 | Hasebe et al. | 358/505 |
| 5,325,474 A * | 6/1994 | Kumazaki et al. | 395/133 |
| 5,327,524 A | 7/1994 | Ng | 395/108 |
| 5,366,835 A | 11/1994 | Namiki et al. | 430/30 |
| 5,495,278 A * | 2/1996 | Oda et al. | 347/252 |
| 5,574,563 A * | 11/1996 | Hayashi et al. | 358/296 |
| 5,841,552 A | 11/1998 | Atobe et al. | 358/447 |

FOREIGN PATENT DOCUMENTS

| | | | |
|---|---|---|---|
| EP | 0411911 A2 | 2/1991 | G06G/15/68 |
| EP | 0411911 A2 * | 2/1991 | G06F/15/68 |
| EP | 0 459 350 A2 | 12/1991 | |
| EP | 0 469 852 A2 | 2/1992 | |
| EP | 0533377 A2 | 3/1993 | G03G/15/04 |
| EP | 0564868 A2 | 10/1993 | H04N/1/40 |
| EP | 0 583 891 A2 | 2/1994 | |
| JP | 04320864 | 11/1992 | |
| JP | 04325264 | 11/1992 | |

* cited by examiner

Primary Examiner—Von J. Couso
(74) Attorney, Agent, or Firm—Fitzpatrick, Cella, Harper & Scinto

(57) ABSTRACT

There is provided an image processing apparatus having an input unit for inputting an image signal, a generation unit for generating a modulation mode signal in accordance with a designation made by an operator using an operation unit, and a modulation unit for selectively outputting a pulse-width modulated signal obtained by performing pulse-width modulation of the image signal input by the input unit in units of m pixels or in units of n pixels (m<n) in accordance with the modulation mode signal generated by the generation unit. There is provided an image processing apparatus having an image input unit for inputting an image signal, a modulation mode input unit for inputting a modulation mode signal from an external device, and a modulation unit for selectively outputting a pulse-width modulated signal obtained by performing pulse-width modulation of the image signal input by the input unit in units of m pixels or in units of n pixels (m<n) in accordance with the modulation mode signal input by the modulation mode input unit.

31 Claims, 17 Drawing Sheets

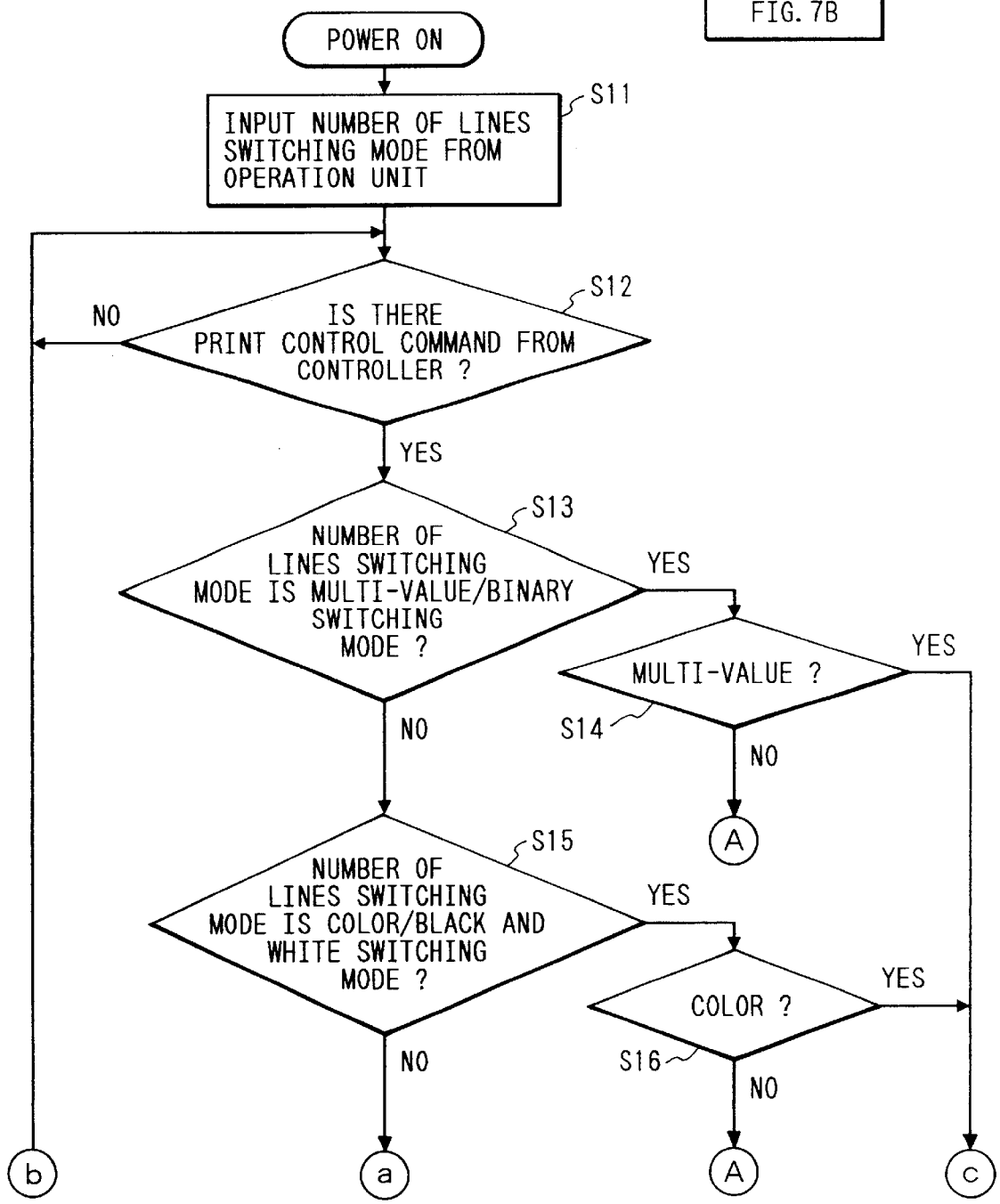

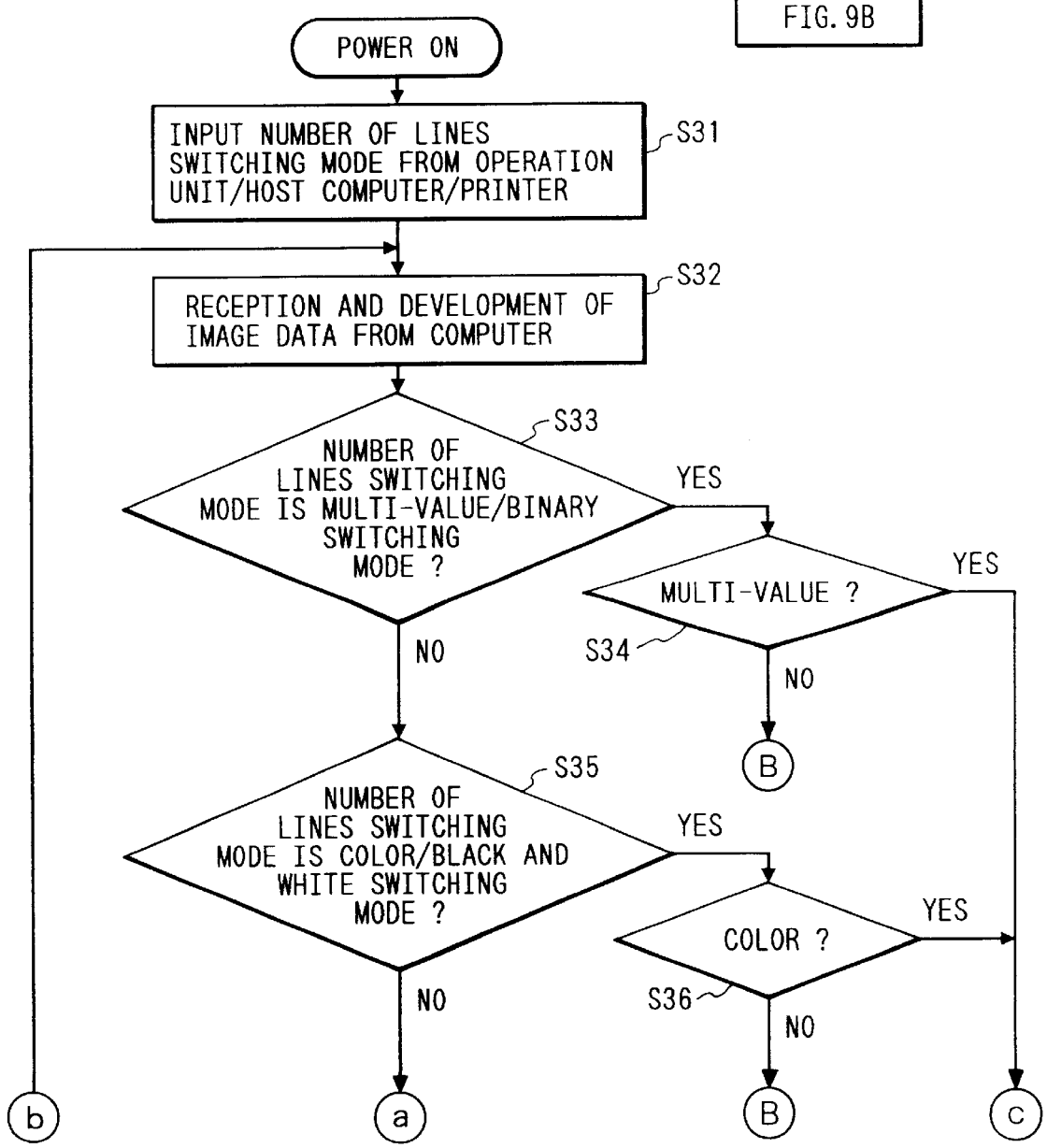

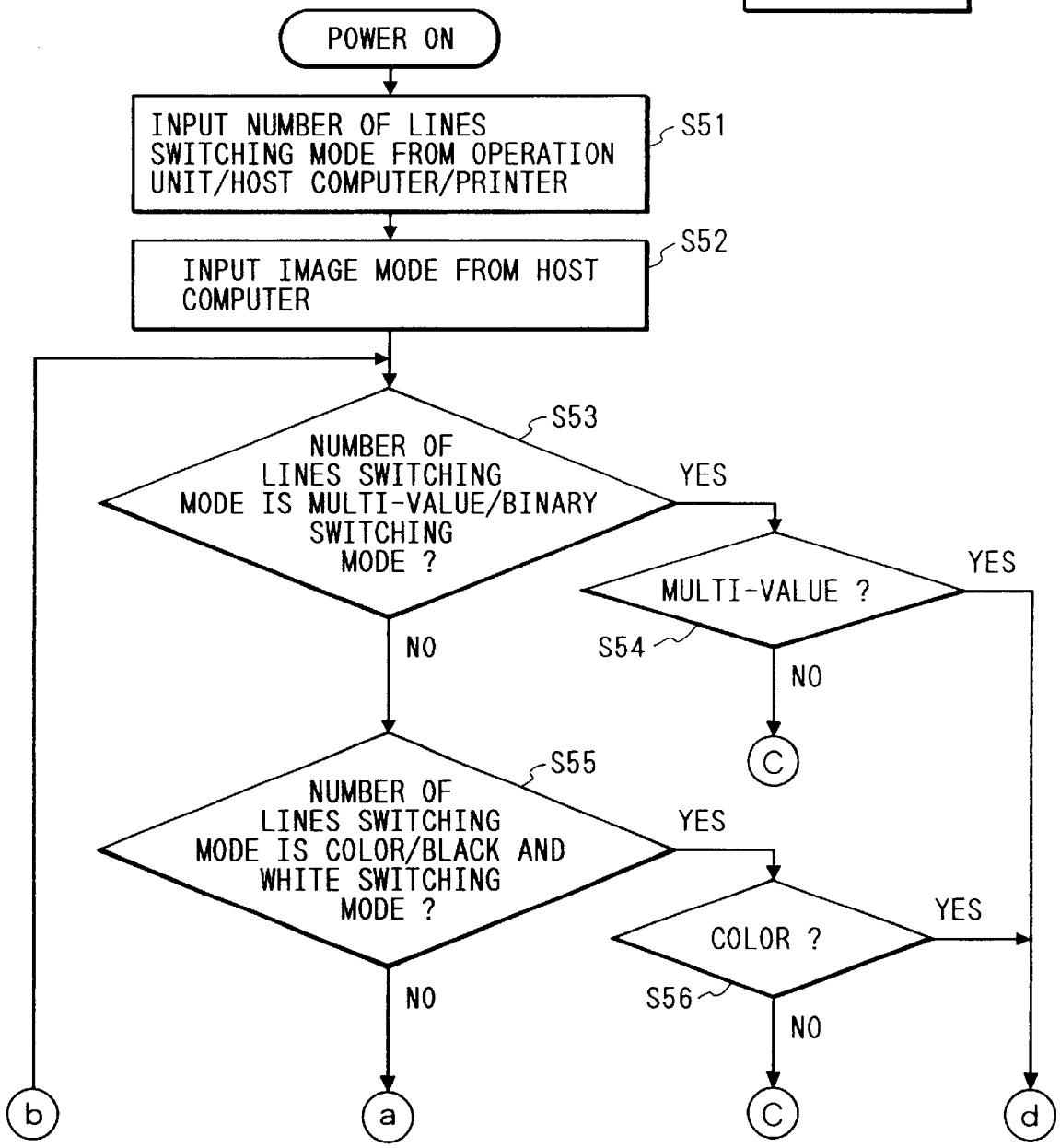

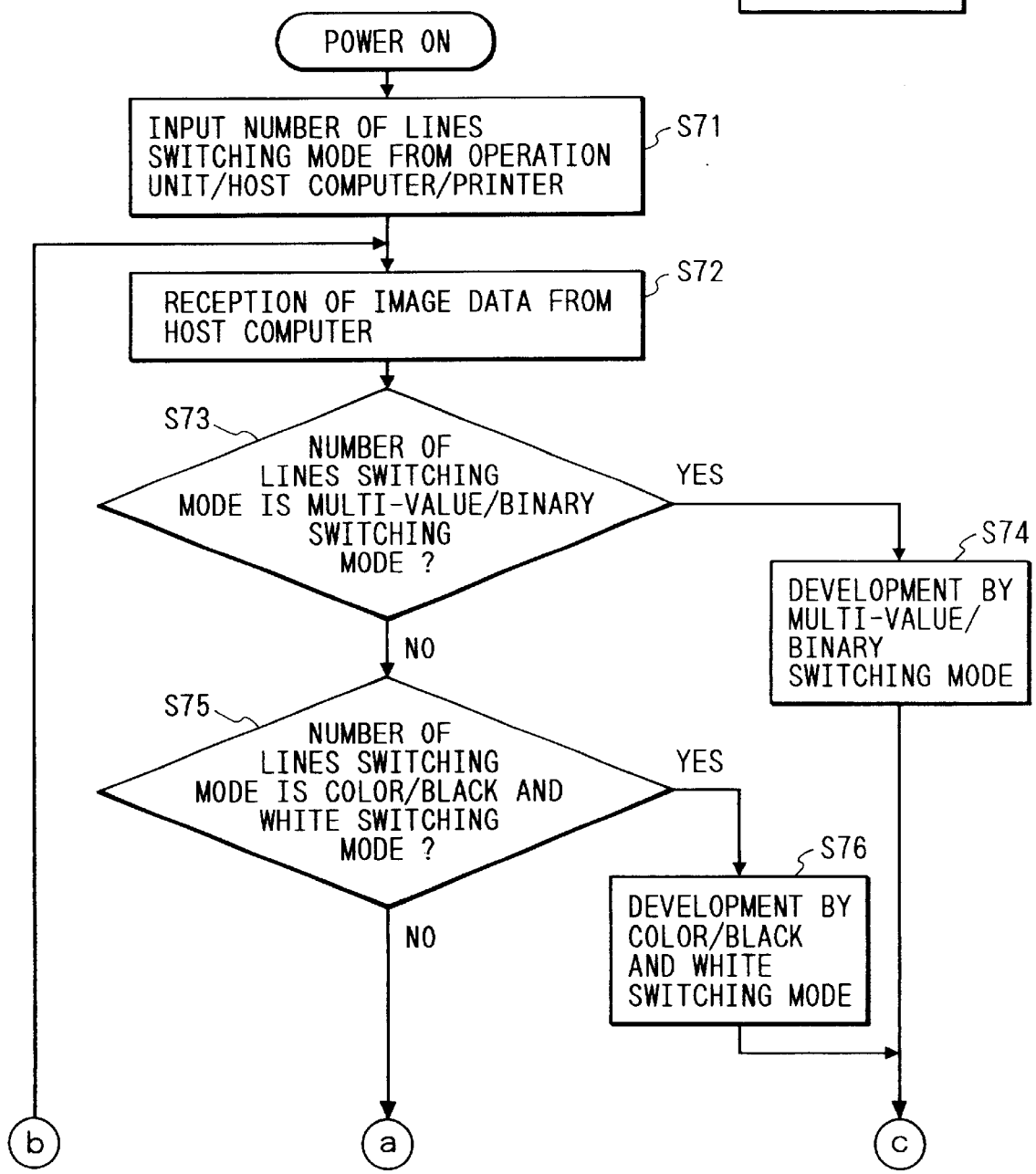

IMAGE PROCESSING APPARATUS FOR PERFORMING IMAGE FORMATION USING SIGNALS OBTAINED BY PULSE-WIDTH MODULATING AN IMAGE SIGNAL BY A PLURALITY OF MODULATING METHODS

BACKGROUND OF THE INVENTION

1. Field of the Invention

The present invention relates to an image processing apparatus and, more particularly, to an image processing apparatus for performing image formation using signals obtained by pulse-width modulating an image signal by a plurality of modulation methods.

2. Related Background Art

Conventionally, an image forming system constituted by a controller for receiving image data from a host computer and supplying received image data to an image forming apparatus, and the image forming apparatus for performing image formation based on the image data sent from the controller has been proposed.

For example, image forming systems which use a color copying machine as the image forming apparatus, and combine it with various types of controllers are commercially available.

The color copying machine serving as the image forming apparatus constituting such conventional system comprises a laser type color electrophotographic printer, which frame-sequentially performs image formation of a plurality of output color components C (Cyan), M (Magenta), Y (Yellow), and K (blacK), and expresses a halftone image by driving a laser using a signal obtained by pulse-width modulating an image signal.

The conventional color copying machine has, as a pulse-width modulation method, a first method of performing pulse-width modulation in units of pixels, and a second method of performing pulse-width modulation in units of certain numbers of pixels.

In the first method, a high resolution can be attained since a pulse is output for each pixel. On the other hand, in the second method, since a pulse is output for each plurality of pixels, the resolution lowers, but the change in pulse width amount with respect to the change in image data becomes larger than that in the first method, and the change in image data can be faithfully reproduced, thus obtaining high gradation characteristics.

As described above, the conventional color copying machine has a resolution of 400 dpi. In the first method, since pulse-width modulation is performed for each pixel, and the screen frequency corresponds to 400 lines per inch, the first method is called a 400 lines mode. On the other hand, in the second method, since pulse-width modulation is performed for each two pixels, and the screen frequency corresponds to 200 lines per inch, the second method is called a 200 lines mode.

In the conventional system, whether image formation is performed in the 200 or 400 lines mode is switched depending on the types of connected controllers, and when a print operation is performed using a single controller, one of the two modes is fixed. More specifically, when a controller which mainly aims at printing character images is used, image formation is always performed in the 400 lines mode, and when a printer which mainly aims at printing gradation images such as photographs is used, image formation is performed in the 200 lines mode.

However, in the conventional system, since the 200 and 400 lines modes are switched depending on the types of controllers, when a character image is output from a controller that performs image formation in the 200 lines mode, the resolution lowers; when a gradation image is output from a controller that performs image formation in the 400 lines mode, the gradation characteristics deteriorate.

SUMMARY OF THE INVENTION

The present invention has been made in consideration of the above situation, and has as its object to provide an image processing apparatus which can satisfactorily reproduce both character and gradation images by performing pulse-width modulation processing corresponding to a given condition in the apparatus upon image formation of an input image signal on a recording medium.

It is another object of the present invention to provide an image processing apparatus in which a controller supplies a mode signal of pulse-width modulation processing to an image forming apparatus in correspondence with a given condition, and the image forming apparatus performs image formation by executing the pulse-width modulation processing in accordance with the received mode signal, thus satisfactorily reproducing both character and gradation images.

In order to achieve the above objects, according to a preferred aspect of the present invention, an image processing apparatus comprises input means for inputting an image signal, generation means for generating a modulation mode signal upon designation by an operator using an operation unit, and modulation means for selectively outputting one of a pulse-width modulated signal obtained by performing pulse-width modulation of the input image signal in units of m pixels and a pulse-width modulated signal obtained by performing pulse-width modulation of the input image signal in units of n pixels (m<n) in accordance with the modulation mode signal generated by the generation means.

According to another preferred aspect of the present invention, an image processing apparatus comprises image input means for inputting an image signal, modulation mode input means for inputting a modulation mode signal from a device outside the apparatus, and modulation means for selectively outputting one of a pulse-width modulated signal obtained by performing pulse-width modulation of the input image signal in units of m pixels and a pulse-width modulated signal obtained by performing pulse-width modulation of the input image signal in units of n pixels (m<n) in accordance with the modulation mode signal input by the modulation signal input means.

Other objects, features and advantages of the invention will become apparent from the following detailed description taken in conjunction with the accompanying drawings.

DETAILED DESCRIPTION OF THE PREFERRED EMBODIMENTS

Figure 1:
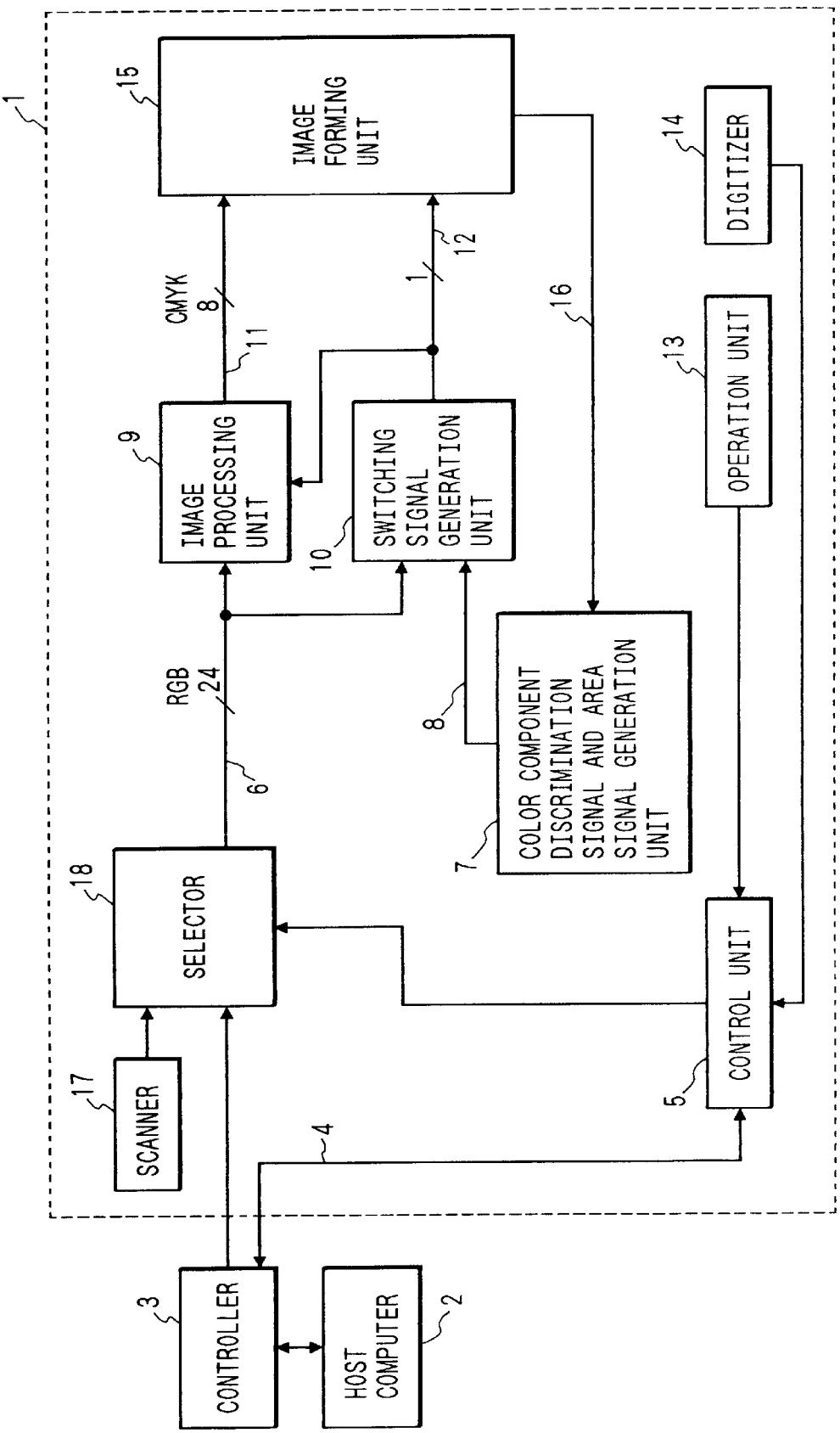
FIG. 1 is a block diagram showing an image forming apparatus according to the first embodiment of the present invention.

FIG. 1 is a block diagram showing a full-color copying machine 1 serving as an image forming apparatus according to the first embodiment of the present invention.

Image data is supplied from a host computer 2 to a controller 3, and is temporarily held in an image 1 memory (not shown) in the controller. Thereafter, an image forming apparatus 1 is started, and a print operation begins. The image data supplied from the host computer 2 is an image described in, e.g., the PDL (Page Description Language). Thus, in the controller, the PDL data is developed into raster image data, which is written in the image memory. In the print operation, the raster image data is sequentially read out from the image memory, and is supplied, as image data 6, to an image processing unit 9 and a switching signal generation unit 10 via a selector 18.

The image data 6 includes R, G, and B color component data, each of which is expressed by 8 bits per pixel, and R, G, and B data for each pixel are parallelly transferred. For this reason, the image data 6 requires a bus width of 24 bits.

The image processing unit 9 performs image processing, e.g., conversion of R, G, and B image data into C, M, Y, and K data 11. The C, M, Y, and K data 11 output from the image processing unit 9 are input to an image forming unit 15.

Since the image forming apparatus 1 of this embodiment is a full-color copying machine, image data obtained by reading an original image using a scanner 17 is also supplied, as the image data 6, to the image processing unit 9 and the switching signal generation unit 10 via the selector 18. The subsequent processing is the same as that in the case wherein image formation of image data from the controller 3 is performed. Whether the selector 18 selects the image from the controller or the image data from the scanner is switched by the controller unit 5 in correspondence with whether the full-color copying machine 1 is set in a printer mode in which the copying machine 1 serves as a printer, or in a copying machine mode in which the copying machine 1 serves as a copying machine. In this embodiment, the copying machine mode is normally set, and the copying machine 1 is switched to the printer mode upon reception of a print command from the controller 3.

A control unit 5 can communicate with the controller 3 via a communication line 4, and controls the respective units in the image forming apparatus 1 via a CPU bus (not shown). An operation unit 13 is used by an operator to set various modes, and a digitizer 14 is also used by the operator to designate a desired area. Although a detailed description of the digitizer 14 will be omitted since it is normally used in a digital copying machine, an original or the like is placed on the digitizer 14, and the area to be designated is indicated using a special-purpose pen, thereby designating the area.

The image forming unit 15 comprises an electrophotographic color printer which frame-sequentially performs image formation of a plurality of output color components C (Cyan), M (Magenta), Y (Yellow), and K (blacK), and the image processing unit 9 outputs one of C, M, Y, and K data in correspondence with the color component to be formed by the image forming unit 15. Therefore, the C, M, Y, and K data 11 require a bus width of 8 bits for one color component.

The image forming unit 15 expresses a halftone image by reproducing an image by driving a laser using a signal obtained by pulse-width modulating an image signal. The image forming unit 15 has, as a pulse-width modulation method, a first method for performing pulse-width modulation in units of pixels, and a second method for performing pulse-width modulation in units of certain numbers of pixels.

In the first method, a high resolution can be attained since a pulse is output for each pixel. On the other hand, in the second method, since a pulse is output for each plurality of pixels, the resolution lowers, but the change in pulse width amount with respect to the change in image data becomes larger than that in the first method, and the change in image data can be faithfully reproduced, thus obtaining high gradation characteristics.

The color copying machine of this embodiment has a maximum resolution of 400 dpi. In the first method, since pulse-width modulation is performed for each pixel, and the screen frequency corresponds to 400 lines per inch, the first method is called a 400 lines mode. On the other hand, in the second method, since pulse-width modulation is performed for each two pixels, and the screen frequency corresponds to 200 lines per inch, the second method is called a 200 lines mode.

The switching signal generation unit 10 generates a number of lines switching signal 12 for selecting one of the 400 or 200 lines mode as the pulse-width modulation method. The generated 1-bit number of lines switching signal 12 is supplied to the image forming unit 15, and is used in number of lines switching. The signal 12 is also supplied to the image processing unit 9.

Figure 5:
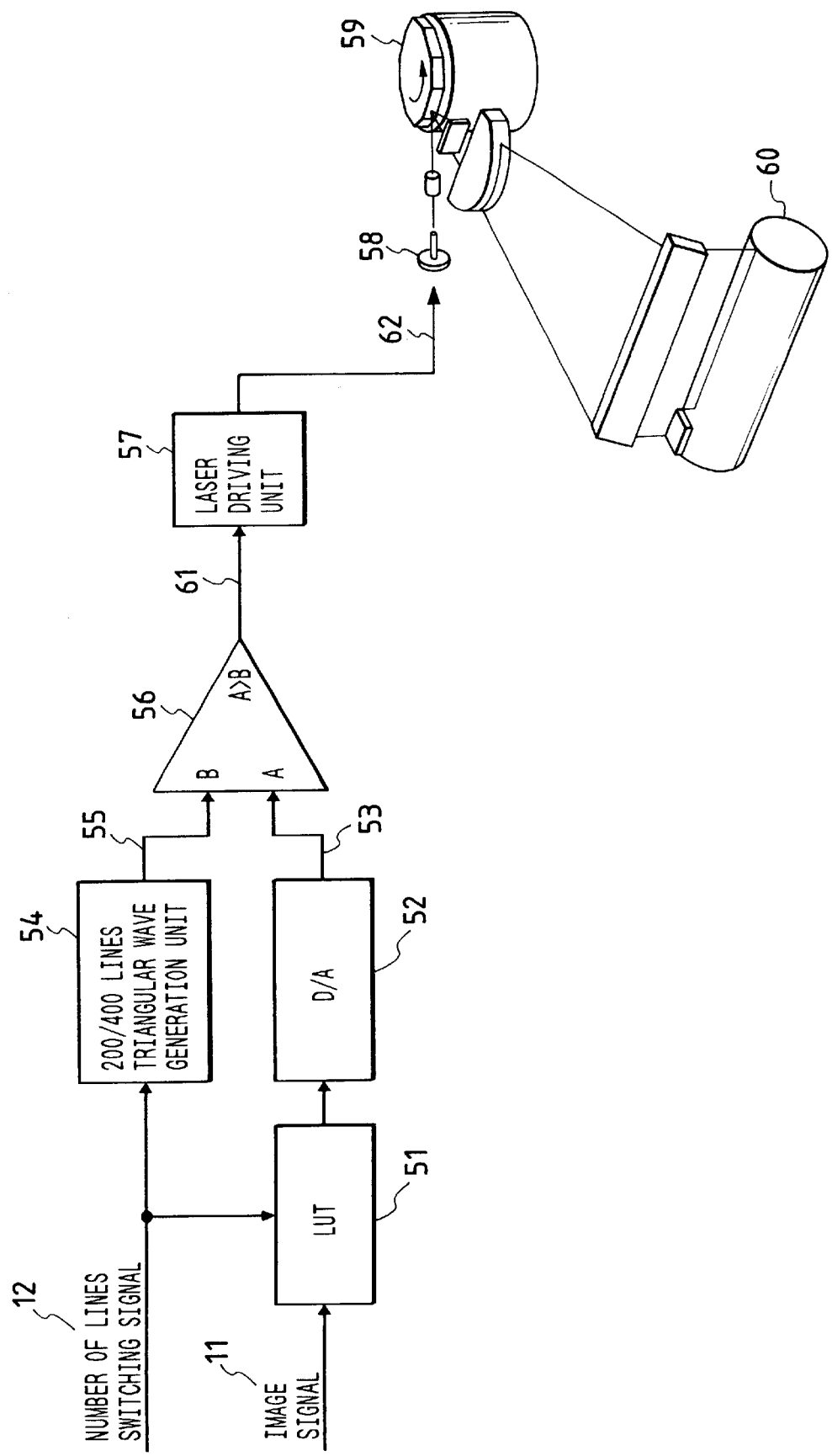
FIG. 5 is a diagram for explaining pulse-width modulation.

As described above, the image processing unit 9 performs image processing such as conversion of R, G, and B data into C, M, Y, and K data. In this case, the unit 9 changes the image processing contents in correspondence with whether the number of lines switching signal 12 indicates the 400 or 200 lines mode. This is to absorb any differences in gradation characteristics obtained upon pulse-width modulation in the 400 and 200 lines modes by the image processing unit 9. In addition to the image processing unit 9, an LUT 51 shown in FIG. 5 (to be described later) also changes the image processing contents in correspondence with whether the switching signal 12 indicates the 400 or 200 lines mode. Note that gradation correction attained by the image processing of the LUT 51 in FIG. 5 is independently performed in units of C, M, Y, and K, while correction processing in the image processing unit 9 corrects a portion, which cannot be absorbed by correction in units of C, M, Y, and K, across respective color components R, G, and B.

More specifically, two different sets of matrix calculation coefficients used for calculating C, M, Y, and K data based on R, G, and B data are prepared, and are selectively used in correspondence with whether the switching signal 12 indicates the 400 or 200 lines mode. In this embodiment, as described above, image processing parameters in two portions, i.e., an RGB image processing portion and a CMYK image processing portion are changed in correspondence with the value of the number of lines switching signal. Other embodiments of the present invention include a case wherein the image processing parameters are changed in one portion and a case wherein the parameters are changed in none of the portions. In this case, the circuit can be simplified.

A color component discrimination signal/area signal generation unit 7 (to be referred to as an area signal generation unit 7 hereinafter) supplies a color component discrimination signal 8-2 and an area signal 8-1 to the switching signal generation unit 10. The area signal 8-1 includes area codes for discriminating a plurality of areas in one page, and is output in synchronism with the image data 6. The switching signal generation unit 10 switches the type of internal processing in correspondence with the area code. More specifically, processing is switched in units of areas. On the other hand, the color component discrimination signal 8-2 is a signal indicating a color component which is being subjected to image formation in the image forming unit 15.

The switching signal generation unit 10 switches the type of internal processing in correspondence with the color component discrimination signal. More specifically, processing is switched in units of color components.

Figure 2:
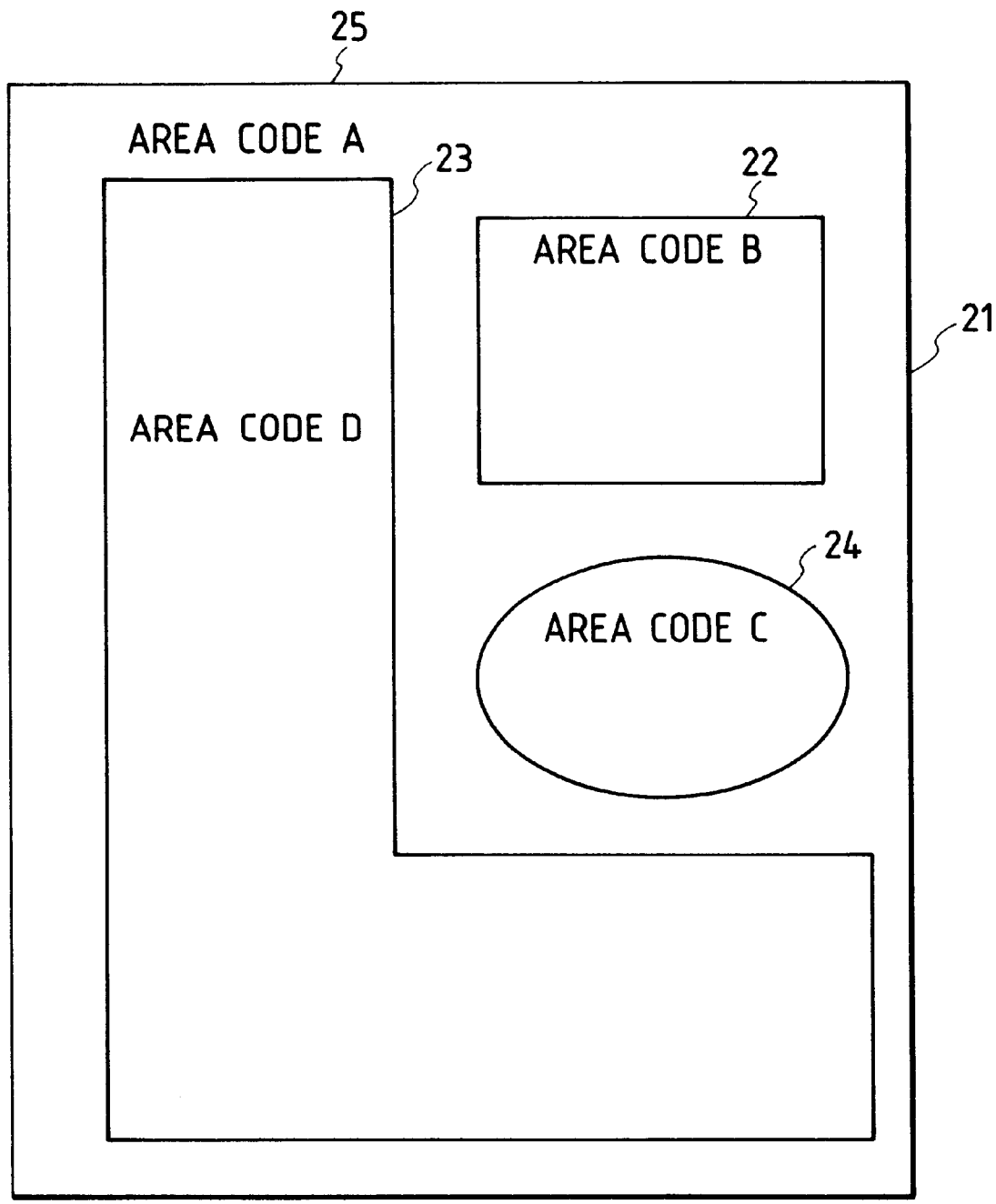
FIG. 2 is a view for explaining the relationship between the area codes and images.

FIG. 2 is a view for explaining the area codes supplied from the area signal generation unit 7.

In FIG. 2, when different processing operations are performed for areas 22, 23, and 24, and an area 25 other than these areas of image data 21 for one page, the area signal generation unit 7 supplies area codes B, D, C, and A in correspondence with these areas 22, 23, 24, and 25. If each area code is an n-bit code, the area signal generation unit 7 has a page memory of n bits per pixel, a CPU or the like draws area codes on the page memory, and these area codes are sequentially read out from the page memory in synchronism with horizontal and vertical synchronization signals 16 supplied from the image forming unit 15. In this embodiment, each area code has 6 bits per pixel. Therefore, a maximum of 64 areas can be processed per page. In this embodiment, the area code can be changed in units of pixels since one code is assigned to one pixel. Alternatively, one code may be assigned to 4×4 pixels to reduce the capacity of the page memory.

The vertical synchronization signal represents synchronization in units of frames upon execution of frame-sequential image formation in the image forming unit 15. More specifically, the vertical synchronization signal is output before formation of each of the C, M, Y, and K color components upon formation of one image, i.e., is output a total of four times.

The area signal generation unit 7 counts the vertical synchronization signals output from the image forming unit 15 using, e.g., a counter, and outputs a signal indicating a color component, which is being currently subjected to image formation, as the color component discrimination signal 8-2. In this embodiment, the color component discrimination signal 8-2 is a 2-bit signal, and assumes a value ranging from 0 to 3 in correspondence with C, M, Y, or K subjected to the current image formation.

Figure 3:
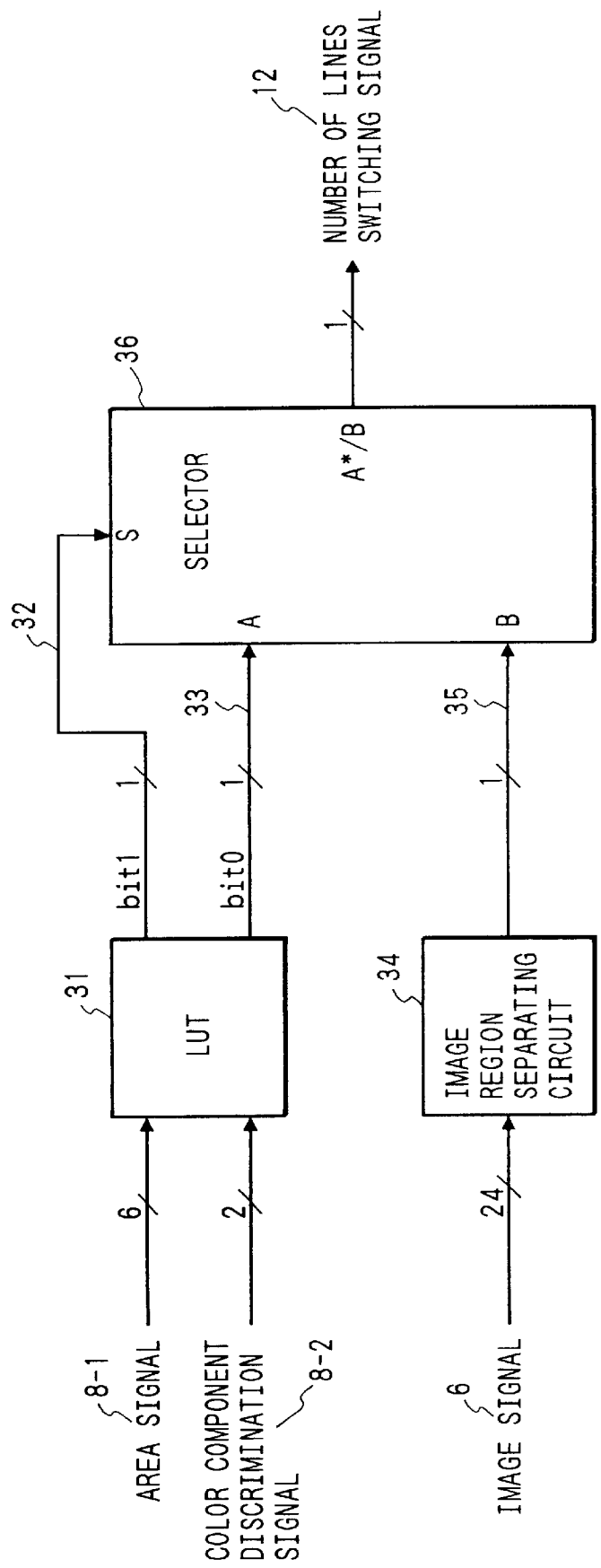
FIG. 3 is a block diagram showing a number of lines switching signal generation unit.

FIG. 3 is a detailed block diagram of the switching signal generation unit 10.

Referring to FIG. 3, the area signal 8-1 and the color component discrimination signal 8-2 supplied from the area signal generation unit 7 are respectively converted into a number of lines switching first candidate signal 33 and a selection signal 32 for a selector 36 by an LUT 31. The LUT 31 comprises, e.g., a RAM. The area signal 8-1 and the color component discrimination signal 8-2 are input to address terminals of the LUT 31, and bits 0 and 1 of data at the corresponding address are respectively output as the number of lines switching first candidate signal 33 and the selection signal 32 for the selector 36. The number of lines switching first candidate signal 33 represents whether the color component and the area respectively designated by the input color component discrimination signal 8-2 and the area signal 8-1 are subjected to image formation in the 200 or 400 lines mode. In this case, "0" indicates the 200 lines image formation mode, and "1" indicates the 400 lines image formation mode. On the other hand, the selection signal 32 for the selector 36 represents whether the selector 36 selects the above-mentioned number of lines switching first candidate signal 33 or a number of lines switching second candidate signal 35 (to be described later) as the number of lines switching signal 12.

On the other hand, the image signal 6 is supplied to an image area separating circuit 34, and is subjected to discrimination between character and photograph portions in units of local areas. In correspondence with the discrimination result, the number of lines switching second candidate signal 35 is output.

A CPU (not shown) in the control unit 5 writes, in the LUT 31, the number of lines switching first candidate signals 33 and the selection signals 32 for the selector 36, which are to be supplied in correspondence with the areas and color components, before operation. In operation, these signals are read out and are supplied to the selector 36. For example, when a certain color component and a certain area are to be subjected to image formation in the 200 lines mode, "0" (bit 0=0, bit 1=0) is written at the corresponding address of the LUT 31. As a result, "0" (200 lines) is output as the number of lines switching signal 12. On the other hand, when a certain color component and a certain area are to be subjected to image formation in the 400 lines mode, "1" (bit 0=1, bit 1=0) is written at the corresponding address of the LUT 31. As a result, "1" (400 lines) is output as the number of lines switching signal 12. Furthermore, when a certain color component and a certain area are to be subjected to image formation while switching the 200 and 400 lines modes in correspondence with the discrimination result in the image area separating circuit 34, "2" (bit 0=0 and bit 1=1) is written at the corresponding address of the LUT 31. As a result, the number of lines switching second candidate signal 35 (see FIG. 4) is output as the number of lines switching signal 12.

Figure 4:
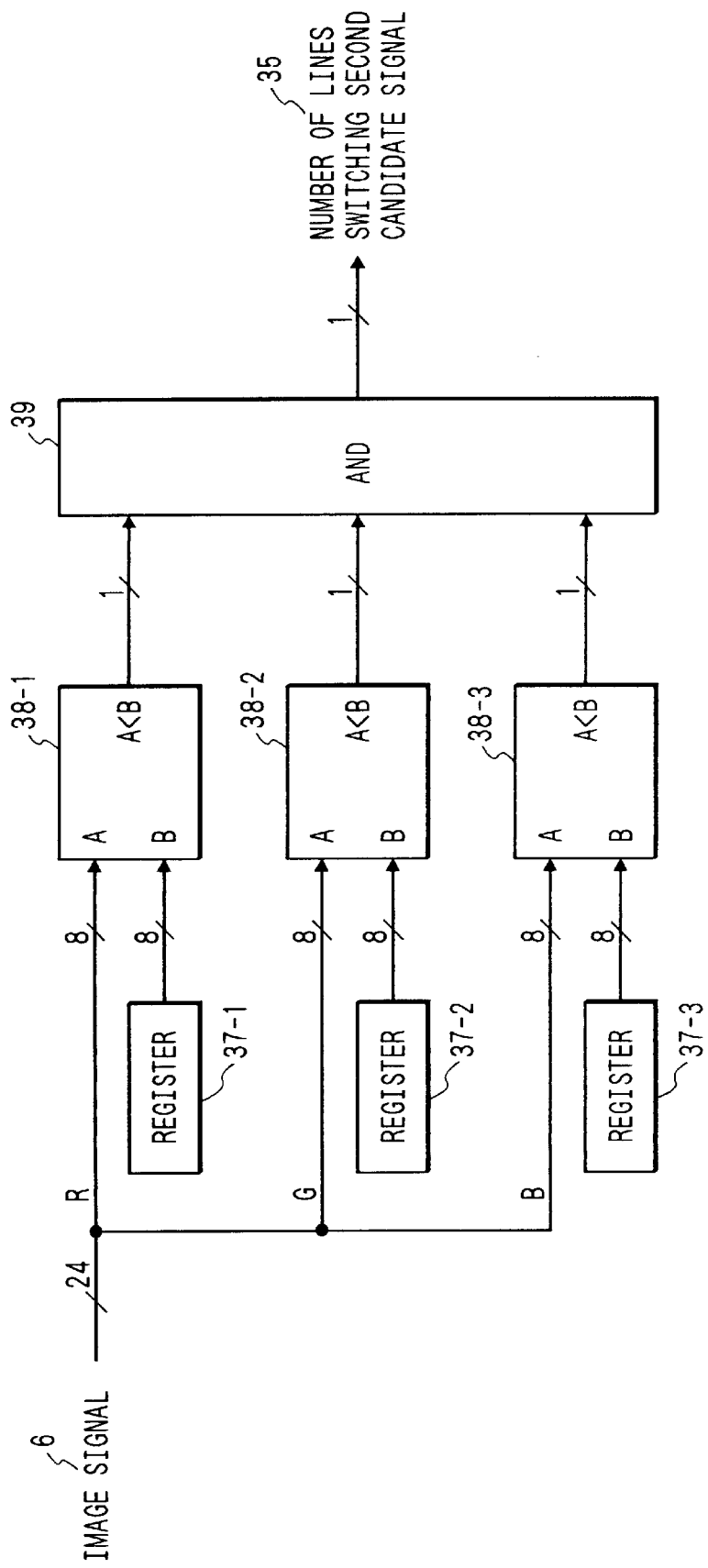
FIG. 4 is a block diagram showing an image area separating circuit.

FIG. 4 is a detailed block diagram of the image area separating circuit 34 shown in FIG. 3.

Referring to FIG. 4, the input RGB 24-bit image signal 6 is separated into R, G, and B components, which are respectively input to comparators 38-1 to 38-3. On the other hand, the outputs from 8-bit registers 37-1 to 37-3 are also supplied to the corresponding comparators. When the image signal is smaller than the value of the register, the comparator outputs "1". A CPU (not shown) writes predetermined values in the registers 37-1 to 37-3 in advance. The outputs from the comparators are input to an AND gate 39. Only when the outputs from the three comparators are all "1"s, the number of lines switching second candidate signal 35 becomes "1" (400 lines). More specifically, only when R<R', G<G', and B<B' are satisfied between the R, G, and B data of the input image signal 6 and predetermined values R', G', and B' set in the registers, the number of lines switching second candidate signal 35 becomes "1" (400 lines); otherwise, the signal 35 becomes "0" (200 lines). In this embodiment, R=G=B=0 represents black. For this reason, when R'=G'=B'=1 are set in the registers 37-1 to 37-3, the signal 35 becomes "1" (400 lines) only when input image data represents black (R=G=B=0) corresponding to a maximum density. On the other hand, for example, when R'=G'=B'=10 are set in the registers 37-1 to 37-3, the signal 35 becomes "1" (400 lines) when input image data represents black (R<10, G<10, B<10) of a relatively high density.

Normally, characters are often black. The image area separating circuit shown in FIG. 4 can set such a black character portion in the 400 lines mode and other portions in the 200 lines mode with a simple arrangement. With this arrangement, a black portion of an image other than black characters is also set in the 400 lines mode. However, since a maximum density portion, i.e., a black portion is not a halftone portion, the 400 or 200 lines image formation mode has almost no influence on the gradation characteristics of the portion. On the other hand, since a black character is formed in the 400 lines mode, a high-resolution image can be obtained, thus attaining high image quality. More specifically, the image area separating circuit 34 adopts a method of discriminating an area in which input image data consists of only pixels of black corresponding to a maximum density (R=G=B=0) as a character area, and other areas as photograph areas by setting R'=G'=B'=1 in the registers 37-1 to 37-3.

In this embodiment, the image area separating circuit has a simple arrangement shown in FIG. 4. However, any other methods may be adopted as long as character and photograph areas can be discriminated from each other. For example, a method of analyzing the frequency components in an input image, a method of checking the intensity and direction of an edge, and the like are available. The image area separating circuit may adopt such a circuit. However, the copying machine requires a large circuit scale since it must discriminate character and photograph areas using image data which is read in an analog manner and includes many noise components. On the other hand, since image data sent from a computer in a digital manner has no noise, it can be discriminated by a relatively small circuit.

In this embodiment, the image area separating circuit uses the same circuit in both the printer mode and the copying machine mode to attain a simple arrangement, and sets different parameters in the printer mode and the copying mode in the registers. More specifically, in,the printer mode, (R=G=B=1) are set to determine an area consisting of only black pixels of a maximum density as a character area. However, in the copying machine mode, in consideration of noise, (R=G=B=10) are set to determine an area consisting of only black pixels of a relatively high density as a character area.

In this embodiment, a character or photograph area is discriminated for each pixel, so that the image area can be switched in units of pixels. However, the image area need not be discriminated in units of pixels. For example, the image area may be discriminated in units of blocks each consisting of 8×8 pixels, so as to attain high-precision discrimination using image data in a wide range.

In this embodiment, discrimination is made in units of pixels, and the discrimination result for each pixel is directly output. Alternatively, post processing for applying the discrimination result to surrounding pixels may be performed. For example, when the pixel of interest is determined as a character area, one pixel (or several pixels) around the pixel of interest is also set in the 400 lines mode. Upon switching between the 400 and 200 lines modes, a triangular waveform (to be described later) may slightly deform depending on the characteristics of an image forming apparatus. In this case, this switching point overlaps the edge portion of a character, and an image of the edge portion is slightly disturbed. Thus, when a character area is determined, one pixel around the pixel of interest is set in the 400 lines mode to shift the switching point to a position slightly outside the character portion. Since the processing for setting one pixel around the pixel of interest in the 400 lines mode can be easily realized by a delay circuit and an OR gate, a description thereof will be omitted.

In this embodiment, all the pixels in an area determined as a character area are formed in the 400 lines mode. However, in another embodiment, pixels corresponding to only the edge portion of a character may be formed in the 400 lines mode. Since a circuit for extracting only the edge portion of an image is well known, the edge portion of a character portion is extracted, so that only the edge portion of the character portion is formed in the 400 lines mode, and other portions are formed in the 200 lines mode.

The image area separating circuit of this embodiment is a circuit for separating image data into character and photograph areas. The image area separating circuit can also be considered as a circuit for discriminating if input image data has a specific value (R=G=B=0), and setting the 400 lines mode when the data has the specific value or setting the 200 lines mode when the data has another value. In view of this, as another arrangement of this circuit, an arrangement for setting the 400 lines mode when R, G, and B data have a combination of only 255 (0xFF) and 0, and R=G=B≠255, and setting the 200 lines mode for other combinations may be adopted. In this case, in addition to black of a maximum density (R=G=B=0), a total of seven color portions such as red of a maximum density (R=255, G=B=0), green of a maximum density (G=255, R=B=0), magenta of a maximum density (G=0, R=B=255), and the like are formed in the 400 lines mode, and other portions are formed in the 200 lines mode. Since colors having a maximum density are often used in a character portion, such color portions are preferably formed in the 400 lines mode. Such a high-density portion has almost no merit of formation in the 200 lines mode since substantially the same gradation characteristics are obtained in the 200 and 400 lines modes. In this sense, such specific value portions are preferably formed in the 400 lines mode.

FIG. 5 is a detailed block diagram of the image forming unit 15 to explain the pulse-width modulation method in the image forming unit 15.

The pulse-width modulation is to change the pulse width of a laser beam to perform image formation in correspondence with the magnitude of an image data value. As the pulse width changes, the average density per unit area of a toner image finally recorded on a recording sheet changes.

In this embodiment, the pulse-width modulation method includes the first method for performing pulse-width modulation in units of pixels, and the second method for performing pulse-width modulation in units of certain numbers of pixels. In the first method, a high resolution can be attained since a pulse is output for each pixel. On the other hand, in the second method, since a pulse is output for each plurality of pixels, the resolution lowers, but the change in pulse width amount with respect to a change in image data becomes larger than that in the first method, and the change in image data can be faithfully reproduced. Therefore, in the second method, an image with high gradation characteristics can be formed.

The color copying machine of this embodiment has a resolution of 400 dpi, and pulse-width modulation is performed for each pixel in the first method. Therefore, since the screen frequency corresponds to 400 lines per inch, the first method will be referred to as a 400 lines mode hereinafter. On the other hand, in the second method, pulse-width modulation is performed for each two pixels. Therefore, since the screen frequency corresponds to 200 lines per inch, the second method will be referred to as a 200 lines mode hereinafter.

In FIG. 5, the image signal 11 supplied from the image processing unit 9 is subjected to gradation correction in the LUT 51 in consideration of the characteristics of the image forming unit 15. The corrected image signal is digital-to-analog-converted by a D/A converter 52, and the analog image signal is input to a comparator 56.

On the other hand, the number of lines switching signal 12 supplied from the switching signal generation unit 10 is a signal which changes in units of pixels, and indicates whether the corresponding pixel is to be pulse-width modulated in the 400 or 200 lines mode. The number of lines switching signal 12 is input to the LUT 51 as upper address data, and switches gradation correction processing in the LUT 51 in correspondence with the pulse-width modulation method. The gradation correction processing is independently performed in units of C, M, Y, and K color components. At the same time, the number of lines switching signal 12 is input to a 200/400 lines triangular wave generation unit 54. In accordance with the number of lines switching signal 12, the 200/400 lines triangular wave generation unit 54 outputs a 200 or 400 lines triangular wave to the comparator 56. The comparator 56 compares an image signal 53 obtained by converting the image data into an analog signal by the D/A converter, and a triangular wave 55 output from the 200/400 lines triangular wave generation unit 54, and sets a laser turn-on signal 61 to be "1" during only a period in which the image data is larger than the triangular wave. A laser driving unit 77 turns on a laser 58 on the basis of the laser turn-on signal 61, and scans a laser beam in the horizontal direction using a polygonal mirror 59, thus irradiating the laser beam onto a photosensitive body 60.

In this embodiment, the maximum value side of image data represents a high density, and toner is attached during the laser turn-on period, thus obtaining a high density.

Figure 6:
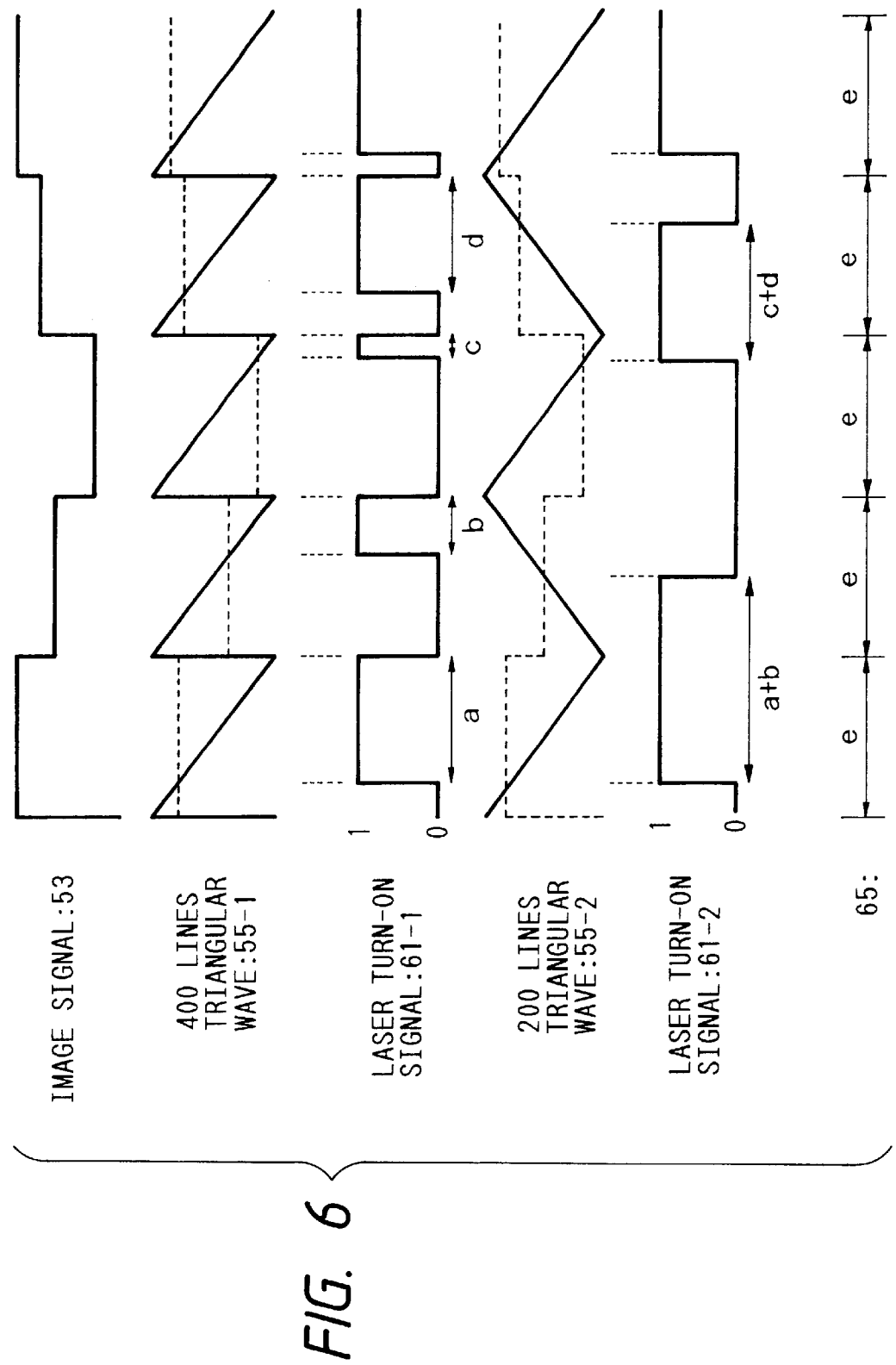
FIG. 6 is a waveform chart of the pulse-width modulation.

FIG. 6 is a waveform chart for explaining the waveforms of a 400 lines triangular wave 55-1 and a 200 lines triangular wave 55-2 generated by the 200/400 lines triangular wave generation unit in FIG. 5, the image signal 53 obtained by D/A-converting image data, and the laser turn-on signal 61.

In FIG. 6, a period e of a portion 65 corresponds to one pixel (400 dpi), and FIG. 6 shows signals for five pixels.

The 400 lines triangular wave 55-1 changes in units of pixels, and as a result, a laser turn-on signal 61-1 also becomes a signal modulated in units of pixels. The laser turn-on signal 61-1 becomes "1" during periods (a, b, c, and d) in which the image signal 53 is larger than the triangular wave 55-1 in respective pixels. More specifically, as the image signal has a larger value, the laser turn-on time (pulse width) is extended; so-called pulse-width modulation is performed. On the other hand, the 200 lines triangular wave 55-2 changes in units of two pixels, and as a result, a laser turn-on signal 61-2 becomes a signal modulated in units of two pixels. The laser turn-on signal 61-2 becomes "1" during periods (a+b, c+d) in which the image signals 53 is larger than the triangular wave 55-2 in each two pixels.

One of these two triangular wave signals is output from the triangular wave generation unit 54 in units of pixels in correspondence with whether the number of lines switching signal 12 is "1" or "0" in FIG. 5.

Upon comparison between the laser turn-on signals based on the two triangular waves, the laser turn-on signal 61-1 can increase the resolution of an output image as compared to the signal 61-2 since the laser beam is turned on/off in units of pixels. On the other hand, the laser turn-on signal 61-2 can faithfully reproduce a change in original image data since it doubles the change in laser turn-on time with respect to the change in original image data as compared to the laser turn-on signal 61-1, thus improving the gradation characteristics. This is because a change in density of an image to be actually formed cannot perfectly follow a high-speed ON/OFF operation of the laser beam since the switching time of the laser, the developing characteristics, and the resolving power such as the particle size of toner are limited.

Figure 7B:
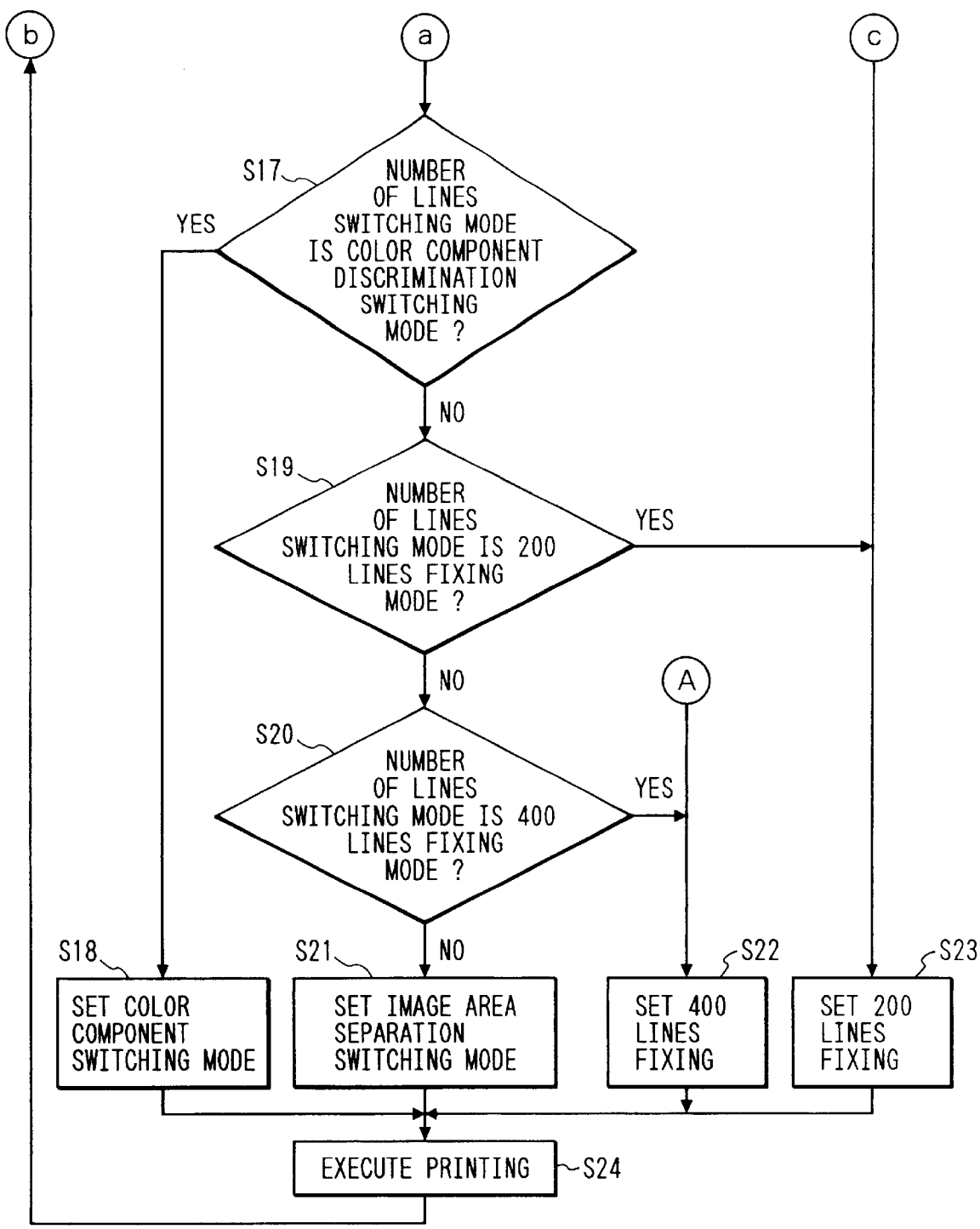
FIG. 7 which is composed of FIGS. 7A and 7B is a flow chart showing the control operation in the first embodiment.

FIGS. 7A and 7B are flow charts for explaining control in this embodiment.

After a power supply switch is turned on, a number of lines switching mode is input from the operation unit 13 in step S11. The number of lines switching mode need not always be input. For example, when the previously set value is held in a memory backed up by a battery or a hard disk, the held mode may be used, or when no mode input operation is performed, a default value may be used. In this embodiment, the number of lines switching mode is input from the operation unit 13. Alternatively, the number of lines switching mode may be supplied from the controller. For the sake of simplicity, the number of lines switching mode is input immediately after the power supply switch is turned on. However, in practice, the input timing is not particularly limited as long as the apparatus is not in operation.

In this embodiment, the following six modes are used as the number of lines switching mode.

1) Multi-value/binary Switching Mode

In this mode, when the image data 6 supplied from the controller is multi-value data, an image is formed in the 200 lines mode; when the image data is binary data, an image is formed in the 400 lines mode. Since multi-value data requires high gradation characteristics, an image is formed in the 200 lines mode that can assure high gradation characteristics. On the other hand, since binary data has no halftone image and does not require high gradation characteristics, an image is formed in the 400 lines mode that can assure a high resolution.

2) Color/black and White Switching Mode

In this mode, when the image data 6 supplied from the controller is color data, an image is formed in the 200 lines mode; when the image data 6 is black and, white data, an image is formed in the 400 lines mode. Since color data requires high gradation characteristics, an image is formed in the 200 lines mode that can assure high gradation characteristics. On the other hand, since black and white data normally corresponds to a character image, an image is formed in the 400 lines mode that can assure a high resolution.

3) Image Component Discrimination Switching Mode

In this mode, C, M, and Y images are formed in the 200 lines mode, and a K image is formed in the 400 lines mode.

In a normal color photograph image, the gradation characteristics of the C, M, and Y images are important, and those of the K image are relatively not important. On the other hand, characters are normally black, and a black character is preferably output at a high resolution although a color character may have a slightly low resolution. For this reason, the 400 and 200 lines modes are switched depending on color components.

4) 200 Lines Fixing Mode

In this mode, the 200 lines mode is fixed. This mode is suitable for outputting a photograph image for one page.

5) 400 Lines Fixing Mode

In this mode, the 400 lines mode is fixed. This mode is suitable for outputting a character image for one page.

6) Image Area Separation Switching Mode

In this mode, it is discriminated in units of local areas if an image included in the area of interest is a character or photograph image, and in accordance with the discrimination result, a character area is formed in the 400 lines mode; a photograph area is formed in the 200 lines mode. This mode is suitable for an image which includes both character and photograph images and allows normal discrimination between character and photograph images. Alternatively, in this mode, it is discriminated if image data included in the area of interest has a specific value, and in accordance with the discrimination result, a specific value area is formed in the 400 lines mode; other areas are formed in the 200 lines mode. This mode is suitable for outputting an image which includes both characters and photograph images, and in which a character image has a specific value.

In this embodiment, the six number of lines switching modes are prepared, and one of these modes is selected by the operation unit 13. Alternatively, an arrangement having some of these six number of lines switching modes or only one of these modes may be adopted.

Note that in the case of the arrangement having only one mode, no selection from the operation unit 13 is required, as a matter of course.

Referring back to FIGS. 7A and 7B, after the number of lines switching mode is input from the operation unit 13 in step S11, the control waits for a print request command from the controller 3 in step S12. If the print request command is detected, it is checked in step S13 if the number of lines switching mode is the multi-value binary switching mode. If YES in step S13, it is checked in step S14 if image data supplied from the controller is multi-value or binary data.

In this embodiment, decision step S14 is attained based on information, indicating whether image data is multi-value or binary data, included in the print request command from the controller. In this embodiment, since image data is sent as RGB 24-bit data, binary data is also sent as RGB 24-bit data (8 bits per color component). In this case, multi-value data assumes one of 256 values ranging from 0 to 255, but binary data assumes one of two values, i.e., 0 or 255. Therefore, in the case of the binary data, the actual number of effective bits is 1 bit. More specifically, although binary data is sent as RGB 24-bit data, the actual number of effective bits is 1 bit per color component.

In this embodiment, multi-value or binary data is determined based on the actual number of effective bits. Alternatively, multi-value or binary data may be determined based on the formal number of bits (the number of signal bits to be used). On the other hand, different signal lines may be used for transferring multi-value and binary data, and multi-value or binary data may be determined based on the signal line to be used.

In this embodiment, the 200 and 400 lines modes are switched depending on whether image data sent from the controller is multi-value or binary data. In another embodiment, when the actual number of effective bits is larger than a predetermined value, image formation may be performed in the 200 lines mode; otherwise, image formation may be performed in the 400 lines mode. More specifically, a small actual number of effective bits means a small number of gradation levels included in data, and in this case, such data can be sufficiently formed using a specific number of gradation levels that can be expressed in the 400 lines mode. For example, when the actual number of effective bits is 4 bits per color component, gradation characteristics of only 16 gradation levels are required per color component, and such data can be sufficiently expressed in the 400 lines mode. In this case, the actual number of effective bits is included in the print request command sent from the controller. Of course, discrimination may be performed using the formal number of bits (the number of signal bits to be used) in place of the actual number of effective bits.

In this embodiment, the 200 and 400 lines modes are switched depending on whether image data sent from the controller is multi-value or binary data. Alternatively, in another embodiment, when the number of colors actually included in image data is larger than a predetermined value, image formation may be performed in the 200 lines mode; otherwise, image formation may be performed in the 400 lines mode. In this case as well, if the number of colors is small, the number of gradation levels that can be expressed in the 400 lines mode is large enough to reproduce such data. For example, a business document often uses only two colors, i.e., black and red of maximum densities, or only about seven colors including blue, green, and the like in addition to the former colors. In such a case, the 400 lines mode that places an importance on the resolution rather than the gradation characteristics is preferable. In this case, the number of colors information is included in the print request command sent from the controller.

When only about seven colors are used, image data is sent using a signal line for RGB 24-bit data that can express $2^{24}$ different colors. In this case, the number of colors information does not indicate this formal value $2^{24}$, but indicates the actual number of effective colors included in data.

In place of the number of colors information, the information indicating a full-color image or a business color image requiring a relatively small number of colors may be supplied from the controller to designate the number of colors in practice.

If it is determined in step S14 by the above-mentioned method that the image data is multi-value data, the flow advances to step S23, and the 200 lines fixing mode is set. More specifically, data "0" is written in all the addresses of the LUT 31 shown in FIG. 3. As a result, independently of the area signal, the color component discrimination signal, and the output from the image area separating circuit, the number of lines switching signal 12 becomes "0" and the image forming unit 15 performs image formation in the 200 lines mode.

On the other hand, if it is determined in step S14 that the image data is binary data, the flow advances to step S22, and the 400 lines fixing mode is set. More specifically, data "1" is written in all the addresses of the LUT 31 shown in FIG. 3. As a result, independently of the area signal, the color component discrimination signal, and the output from the image area separating circuit, the number of lines switching signal 12 becomes "1" and the image forming unit 15 performs image formation in the 400 lines mode.

If it is determined in step S13 that the number of lines switching mode is not the multi-value/binary switching mode, the flow advances to step S15 to check if the number of lines switching mode is the color/black and white switching mode.

If YES in step S15, the flow advances to step S16 to check if image data sent from the controller 3 is color or black and white data. In this embodiment, this decision step is attained by discriminating information which is included in the print request command supplied from the controller and indicates that the image data is color or black and white data. In this embodiment, since image data is sent as RGB 24-bit data, black and white data is also sent as RGB 24-bit data (8 bits per color component). In this embodiment, in the case of black and white data, all the R, G, and B components have the same value. In addition, image formation in the image forming unit is performed not four times for C, M, Y, and K but only once for K. In this case, only one color component signal (e.g., R 8-bit data) may be used, and the image processing unit 9 may form K data based on only the R line. Alternatively, in the case of black and white data, image formation may be performed in correspondence with C, M, Y, and K components.

If it is determined in step S16 that the image data is color data, the flow advances to step S23, and the 200 line fixing mode is set. On the other hand, if it is determined in step S16 that the image data is black and white data, the flow advances to step S22, and the 400 lines fixing mode is set.

If it is determined in step S15 that the number of lines switching mode is not the color/black and white switching mode, the flow advances to step S17 to check if the number of lines switching mode is the color component discrimination switching mode.

If YES in step S17, the flow advances to step S18, and a setting operation for this mode is performed. More specifically, when the color component discrimination signal of the LUT 31 shown in FIG. 3 indicates K, data "1" is written in all the addresses; otherwise, data "0" is written in all the addresses. As a result, independently of the area signal and the output from the image area separating circuit, the number of lines switching signal 12 becomes "1" (400 lines) when the color component discrimination signal indicates K, or becomes "0" (200 lines) when the color component discrimination signal indicates another color, i.e., C, M, or Y.

If it is determined in step S17 that the number of lines switching mode is not the color component discrimination mode, it is checked in steps S19 and S20 if the number of lines switching mode is the 200 or 400 lines fixing mode.

If it is determined in step S19 that the number of lines switching mode is the 200 lines fixing mode, the flow advances to step S23, and the 200 lines fixing mode is set. On the other hand, if it is determined in step S20 that the number of lines switching mode is the 400 lines fixing mode, the flow advances to step S22, and the 400 lines fixing mode is set.

If the number of lines switching mode is neither the 200 lines fixing mode nor the 400 lines fixing mode, since the remaining mode is the image area separation switching mode, a setting operation for the image area separation switching mode is performed in step S21. More specifically, data "2" is written in all the addresses of the LUT shown in FIG. 3. As a result, independently of the area signal and the color component discrimination signal, the number of lines switching second candidate signal 35 as the output from the image area separating circuit 34 is directly output as the number of lines switching signal 12. As a result, the signal 12 becomes "1" (400 lines) for a portion which is discriminated as a character portion by the image area separating circuit 34; and becomes "0" (200 lines) for a portion which is discriminated as a photograph portion by the circuit 34. When the image area separating circuit 34 uses a circuit for separating a specific value area from other areas, as has been described above with reference to FIG. 4, in place of the circuit for separating character and photograph portions, the signal 12 becomes "1" (400 lines) for a portion which is discriminated as a specific value portion; and becomes "0" (200 lines) for a portion which is discriminated as other portions.

After the setting operation for each mode is completed, the flow advances to step S24, and an actual print operation is performed. Upon completion of the print operation, the flow returns to step S12.

Although no specific explanation is given in the description of the control flow shown in FIGS. 7A and 7B for the sake of simplicity, the number of lines switching mode can be changed depending on areas in this embodiment. More specifically, the color component switching mode set in step S18, the image area separation switching mode set in step S21, the 400 lines fixing mode set in step S22, and the 200 lines fixing mode set in step S23 can be independently designated in units of areas.

On the other hand, whether image data sent from the controller is multi-value or binary data, or color or black and white data can only be determined for the entire image. For this reason, the number of lines switching mode that requires such information cannot be switched in units of areas. In order to use different switching mode in units of areas, when the number of lines switching mode is input from the operation unit in step S11, a given area is designated using the digitizer 14, and thereafter, the number of lines switching mode is input. With this operation, a plurality of pairs of area information and number of lines switching modes are obtained. This area information is set in the area signal generation unit 7. Thereafter, the setting processing in the LUT 31 in steps S13 to S23 is repeated in correspondence with the number of areas. At this time, when a setting operation for a given area is performed, data is written at only addresses when the area signal indicates an area code of the corresponding area. On the other hand, in a print operation, since an area code is read out from the area signal generation unit 7 and is supplied to the switching signal generation unit 10 to read out data at the addresses, corresponding to this area code, of the LUT 31, different number of lines switching processing can be performed in units of areas.

Figure 8:
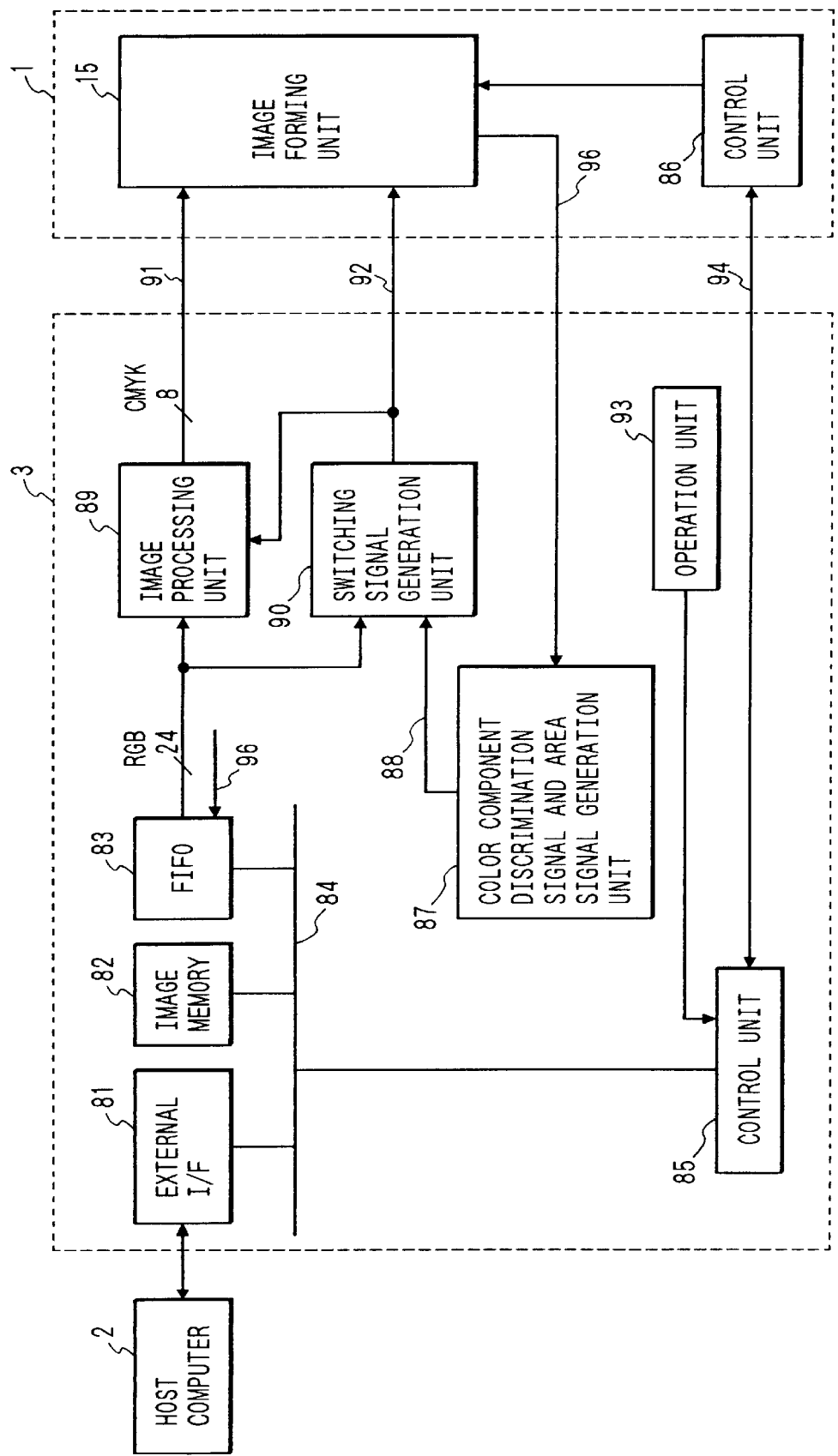
FIG. 8 is a block diagram of an image forming apparatus and an image processing apparatus according to the second embodiment of the present invention.

FIG. 8 is a block diagram showing a controller 3 as an image processing apparatus and an image forming apparatus 1 according to the second embodiment of the present invention. In the first embodiment, the 200/400 lines switching signal is generated in the image forming apparatus. However, in this embodiment, the controller generates a 200/400 lines switching signal, and supplies it to the image forming apparatus 1, thereby switching the modes.

Since the blocks in FIG. 8 having the same names as those in FIG. 1 have the same functions as those in the first embodiment, a detailed description thereof will be omitted, and only new blocks and the relationship of blocks will be explained below.

Image data supplied from a host computer 2 is written in an image memory 82 via an external I/F circuit 81. Thereafter, the image forming apparatus 1 is started, and a print operation is started. The image data supplied from the host computer 2 is an image described in, e.g., the PDL (Page Description Language). Thus, a CPU (not shown) in a control unit 85 develops the received image data into raster image data, and writes the raster image data in the image memory 82. In a print operation, the raster image data is sequentially read out from the image memory 82, and is written in a FIFO 83. The write control to the FIFO 83 is attained by the CPU (not shown) or a DMA controller (not shown) in the control unit 85 for, e.g., each main scan.

The image data written in the FIFO 83 is read out in synchronism with synchronization signals from an image forming unit 15, and is supplied to an image processing unit 89 and a switching signal generation unit 90. This image data is RGB data, and requires a bus width of 24 bits.

The image processing unit 89 performs image processing, e.g., conversion of the RGB data output from the FIFO 83 into CMYK data 91. The CMYK image data 91 output from the image processing unit 89 is supplied to the image forming apparatus 1.

The control unit 85 communicates with the host computer 2 via the external I/F circuit 81, and also communicates with a control unit 86 of the image forming apparatus 1 via a communication line 94. In addition, the control unit 85 controls the respective units in the image forming apparatus via a CPU bus 84 (partially not shown). An operation unit 93 is used by an operator to set various modes. The operation unit 93 comprises a CRT, a keyboard, and a mouse, and allows the operator to preview the contents of the image memory 82 before a print operation and to designate an area in the image using the mouse while observing the preview image. Since such a CRT display and an area input system using a mouse are normally used in a workstation or a personal computer, a detailed description thereof will be omitted.

A switching signal generation unit 90 generates a number of lines switching signal 92 indicating whether a 400 or 200 lines mode is selected as a pulse-width modulation method, as in the first embodiment. The generated number of lines switching signal 92 is supplied to the image forming apparatus 1 in synchronism with the CMYK image data 91, and is used in number of lines switching. In addition, the signal 92 is also supplied to the image processing unit 89. As described above, the image processing unit 89 performs image processing, e.g., conversion of RGB data into CMYK image data. In this processing, the unit 89 changes the image processing contents in correspondence with whether the number of lines switching signal 92 indicates the 400 or 200 lines mode.

A color component discrimination signal/area signal generation unit 87 (to be referred to as an area signal generation unit 87 hereinafter) supplies a color component discrimination signal 88-2 and an area signal 88-1 to the switching signal generation unit 90 as in the first embodiment.

The image forming apparatus 1 receives the CMYK image data 91 and the number of lines switching signal 92 from the external apparatus, and performs image formation in accordance with these data.

The image forming unit 15 in the image forming apparatus 1 is an electrophotographic color printer, which frame-sequentially performs image formation for a plurality of output color components C (Cyan), M (Magenta), Y (Yellow), and K (blacK), and one of C, M, Y, and K data is output from the image processing unit 89 in correspondence with the color component to be subjected to image formation in the unit 15. Therefore, the CMYK image data 91 requires a bus width of 8 bits for one color component. The image forming unit 15 forms an image by two different pulse-width modulation methods, i.e., the 400 and 200 lines modes, as in the first embodiment. In this case, the unit 15 performs image formation by switching these two different pulse-width modulation methods in accordance with the externally input number of lines switching signal 92.

The internal arrangement of the image forming unit 15 is the same as that in the first embodiment.

Figure 9B:
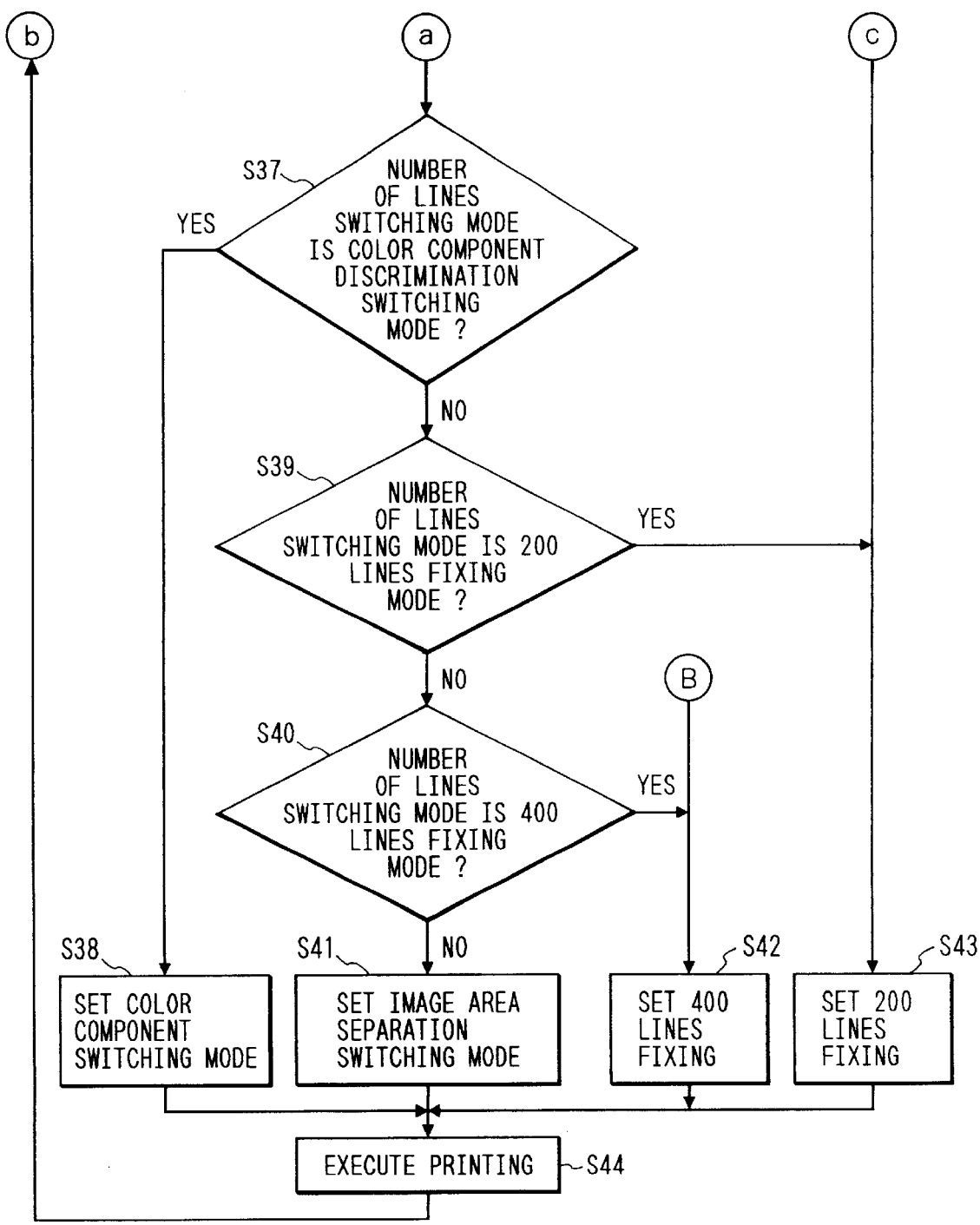
FIG. 9 which is composed of FIGS. 9A and 9B is a flow chart showing the control operation in the second embodiment.

FIGS. 9A and 9B are flow charts for explaining the control on the controller side in this embodiment.

After a power supply switch is turned on, the number of lines switching mode is input from the operation unit 93 of the controller, is input from the host computer, or is input from the image forming apparatus, in step S31. When the mode is input from the host computer 2, command data and the like are received via the external I/F circuit 81. When the mode is input from the image forming apparatus 1, command data and the like are received from the control unit 86 of the image forming apparatus 1 via the communication line 94. In addition, the mode may be input from two or more of these input sources or one of the input sources. Furthermore, the mode may be input from none of these input sources, and if a previously set value is held in a memory backed up by a battery or a hard disk, the held value may be used. Moreover, a default value when no setting operation is performed may be used. For the sake of simplicity, the mode is input immediately after the power supply switch is turned on. However, the input timing is not particularly limited as long as the image forming apparatus is not in operation.

In this embodiment, the number of lines switching mode includes the following six modes. Since the respective modes are the same as those in the first embodiment, a detailed description thereof will be omitted.

1) Multi-value/binary Switching Mode

In this mode, when the contents of image data 91 to be supplied to the image forming apparatus indicate multi-value data, an image is formed in the 200 lines mode; when the contents indicate binary data, an image is formed in the 400 lines mode.

2) Color/black and White Switching Mode

In this mode, when the contents of image data 91 to be supplied to the image forming apparatus indicate color data, an image is formed in the 200 lines mode; when the contents indicate black and white data, an image is formed in the 400 lines mode.

3) Color Component Discrimination Switching Mode

In this mode, C, M, and Y images are formed in the 200 lines mode, and a K image is formed in the 400 lines mode.

4) 200 Lines Fixing Mode

In this mode, the 200 lines mode is fixed.

5) 400 Lines Fixing Mode

In this mode, the 400 lines mode is fixed.

6) Image Area Separation Switching Mode

In this mode, it is discriminated in units of local areas if an image included in the area of interest is a character or photograph image, and in accordance with the discrimination result, a character area is formed in the 400 lines mode; a photograph area is formed in the 200 lines mode. Alternatively, in this mode, it is discriminated if image data included in the area of interest has a specific value, and in accordance with the discrimination result, a specific value area is formed in the 400 lines mode; other areas are formed in the 200 lines mode.

In this embodiment, the six number of lines switching modes are prepared, and one of these modes is selected by the operation unit, host computer, or image forming apparatus. Alternatively, some or only one of these six number of lines switching modes may be prepared. When only one mode is available, no selection is required from the operation unit or the like, as a matter of course.

After the number of lines switching mode is input in step S31 in FIG. 9A, the flow advances to step S32. In step S32, image data is received from the host computer, and is developed onto the image memory 82. Upon completion of reception of image data for one page, the flow advances to step S33.

In step S33, it is checked if the number of lines switching mode is the multi-value/binary switching mode. If YES in step S33, the flow advances to step S34 to check if image data to be supplied to the image forming apparatus is multi-value or binary data. In this embodiment, this decision step is attained based on information which is included in image data sent from the host computer and indicates that the image data is multi-value or binary data.

When binary image data to be received from the host computer is sent in the format of RGB 24-bit data, the data can be directly written in the image memory 82. However, when binary image data is sent in the format of one bit per pixel or one bit per color component of one pixel, the binary image data is converted into RGB 24-bit data before it is written in the image memory, and the converted data is written. More specifically, when the binary image data is sent in the format of, e.g., one bit per pixel, R=G=B=0 or R=G=B=255 (0xFF) is written in correspondence with the pixel value="0" or "1". In this manner, binary data is converted into RGB 24-bit data (8 bits per color component), which is sent to the image forming apparatus.

Note that multi-value data assumes one of 256 values ranging from 0 to 255 per color component, but binary data assumes one of two values, i.e., 0 or 255. Therefore, in the case of the binary data, the actual number of effective bits is 1 bit per color component. As described above, in this embodiment, whether the image data to be sent to the image forming apparatus is multi-value or binary data is determined based not on the number of signal bits to be used but on the actual number of effective bits included in image data to be sent.

Alternatively, multi-value or binary data may be determined based on the formal number of bits (the number of signal bits to be used). On the other hand, different signal lines may be used for transferring multi-value and binary data, and multi-value or binary data may be determined based on the signal line to be used.

In this embodiment, the 200 and 400 lines modes are switched depending on whether image data sent from the controller is multi-value or binary data. In another embodiment, when the actual number of effective bits is larger than a predetermined value, image formation may be performed in the 200 lines mode; otherwise, image formation may be performed in the 400 lines mode, as in the first embodiment. Of course, discrimination may be performed using the formal number of bits (the number of signal bits to be used) in place of the actual number of effective bits.

In this embodiment, the 200 and 400 lines modes are switched depending on whether the image data sent from the controller is multi-value or binary data. Alternatively, in another embodiment, when the number of colors actually included in image data is larger than a predetermined value, image formation may be performed in the 200 lines mode; otherwise, image formation may be performed in the 400 lines mode. In this case, the number of colors information is included in the image data sent from the host computer, and discrimination is made based on this information. Furthermore, the number of colors may be designated in practice by information indicating a full-color image or a business color image requiring a relatively small number of colors in place of the number of colors information.

Referring back to FIGS. 9A and 9B, if it is determined in step S34 that the image data is multi-value data, the flow advances to step S43, and the 200 lines fixing mode is set. The detailed setting method is the same as that in the first embodiment.

On the other hand, if it is determined in step S34 that the image data is binary data, the flow advances to step S42, and the 400 lines fixing mode is set. The detailed setting method is the same as that in the first embodiment.

If it is determined in step S33 that the number of lines switching mode is not the multi-value/binary switching mode, the flow advances to step S35.

It is checked in step S35 if the number of lines switching mode is the color/black and white switching mode. If YES in step S35, the flow advances to step S36 to check if image data to be sent to the image forming apparatus is color or black and white data. This decision step is attained based on information which is included in the image data sent from the host computer and indicates that the image data is color or black and white data.

When black and white image data to be received from the host computer 2 is sent in the format of RGB 24-bit data, it can be directly written in the image memory 82. However, when image data is sent in the format of a black and white component per pixel, it is converted into RGB 24-bit data before being written in the image memory, and the converted data is written in the image data. For example, when one pixel is expressed by an 8-bit black and white component, all the R, G, and B components are set to have values corresponding to that of the black and white component. In this manner, black and white data is converted into RGB 24-bit data (8 bits per color component), which is sent to the image forming apparatus. In the case of color data, R, G, and B color components may assume different values, but in the case of black and white data, R, G, and B components assume the same value.

If it is determined in step S36 that the image data is color data, the flow advances to step S43, and the 200 lines fixing mode is set. On the other hand, if it is determined in step S36 that the image data is black and white data, the flow advances to step S42, and the 400 lines fixing mode is set.

If it is determined in step S35 that the number of lines switching mode is not the color/black and white switching mode, the flow advances to step S37 to check if the number of lines switching mode is the color component discrimination switching mode. If YES in step S37, the flow advances to step S38, and a setting operation for this mode is performed. The detailed setting method is the same as that in the first embodiment.

If it is determined in step S37 that the number of lines switching mode is not the color component discrimination switching mode, it is checked in steps S39 and S40 if the number of lines switching mode is the 200 or 400 lines fixing mode. If it is determined in step S39 that the number of lines switching mode is the 200 lines fixing mode, the flow advances to step S43, and the 200 lines fixing mode is set. On the other hand, if it is determined in step S40 that the number of lines switching mode is the 400 lines fixing mode, the flow advances to step S42, and the 400 lines fixing mode is set.

If the number of lines switching mode is neither the 200 lines fixing mode nor the 400 lines fixing mode, since the remaining mode is the image area separation switching mode, the flow advances to step S41, and a setting operation for the image area separation switching mode is performed. The detailed setting method is the same as that in the first embodiment.

Upon completion of the setting operation for each mode, an actual print operation is performed in step S44. After the print operation is completed, the flow returns to step S32.

Although no specific explanation is given in the description of the control flow shown in FIGS. 9A and 9B for the sake of simplicity, the number of lines switching mode can be changed depending on areas in this embodiment. More specifically, the color component switching mode set in step S38, the image area separation switching mode set in step S41, the 400 lines fixing mode set in step S42, and the 200 lines fixing mode set in step S43 can be independently designated in units of areas. On the other hand, whether image data to be sent to the image forming apparatus is multi-value or binary data, or color or black and white data can only be determined for the entire image, and the number of lines switching mode that requires such information cannot be switched in units of areas.

In order to use different switching modes in units of areas, in place of inputting the number of lines switching mode from the operation unit in step S31, after image data is developed onto the image memory in step S32, the developed image is displayed for preview purposes on the CRT in the operation unit 93, a given area is designated using the mouse, and the number of lines switching mode for the designated area is input from the operation unit. With this operation, a plurality of pairs of area information and number of lines switching modes are obtained. This area information is set in the area signal generation unit 87. Thereafter, setting processing in the LUT 31 in steps S33 to S43 is repeated in correspondence with the number of areas. At this time, when a setting operation for a given area is performed, data is written at only addresses when the area signal indicates an area code of the corresponding area. On the other hand, in a print operation, since an area code is read out from the area signal generation unit 87 and is supplied to the switching signal generation unit 90 to read out data at the addresses, corresponding to this area code, of the LUT 31, different number of lines switching processing can be performed in units of areas. As described above, since an area is designated while observing a preview image, and the number of lines switching mode for each area is designated, reliable designation can be attained.

As another embodiment, in place of performing area designation using the CRT and the mouse in the operation unit 93, area designation may be performed using a digitizer or the like (not shown) in the image forming apparatus 1, and the designated information may be received via the communication line 94.

As another embodiment, in place of performing area designation using the CRT and the mouse in the operation unit 93, a plurality of pairs of area information and number of lines switching modes may be received from the host computer 2 via the external I/F circuit 81.

In this embodiment, whether an image signal to be sent to the image forming apparatus is multi-value or binary data, or color or black and white data is discriminated based on the contents of an image mode included in image data sent from the host computer. Alternatively, as another embodiment, the image mode may be checked by a CPU (not shown) in the control unit 85 when the received image data is developed onto the image memory. More specifically, upon development of, e.g., PDL data sent from the host computer, if the PDL data includes at least one multi-value data, image data is processed as multi-value data; if the PDL data. includes binary data only, image data is processed as binary data. The same applies to color or black and white data.

Also, as another embodiment, an image developed onto the image memory 82 may be checked to determine multi-value/binary data, or color/black and white data, in addition to the above-mentioned method. More specifically, it is checked in step S34 by checking image data on the image memory if image data to be sent to the image forming apparatus is multi-value data or binary data. Furthermore, it is checked in step S36 by checking image data on the image memory if image data to be sent to the image forming apparatus is color or black and white data. This method also allows multi-value/binary or color/black and white discrimination in units of areas. In other words, the multi-value/binary switching mode and the color/black and white switching mode can be used as the number of lines switching modes, which can be switched in units of areas.

More specifically, after image data is developed onto the image memory in step S32, the developed image is displayed for preview purposes on the CRT in the operation unit 93, a given area is designated using the mouse, and the number of lines switching mode in the area is input from the operation unit. With this operation, a plurality of pairs of area information and number of lines switching modes are obtained. This area information is set in the area signal generation unit 87. Thereafter, setting processing in the LUT 31 in steps S33 to S43 is repeated in correspondence with the number of areas. At this time, whether image data to be sent to the image forming apparatus is multi-value or binary data is discriminated in step S34 for only the corresponding area by checking image data of the corresponding area on the image memory.

Also, whether image data to be sent to the image forming apparatus is color or black and white data is discriminated in step S36 for only the corresponding area by checking image data of the corresponding area on the image memory. In accordance with the discrimination result, the 400 or 200 lines fixing mode is set for only the corresponding area in step S42 or S43.

Figure 10:
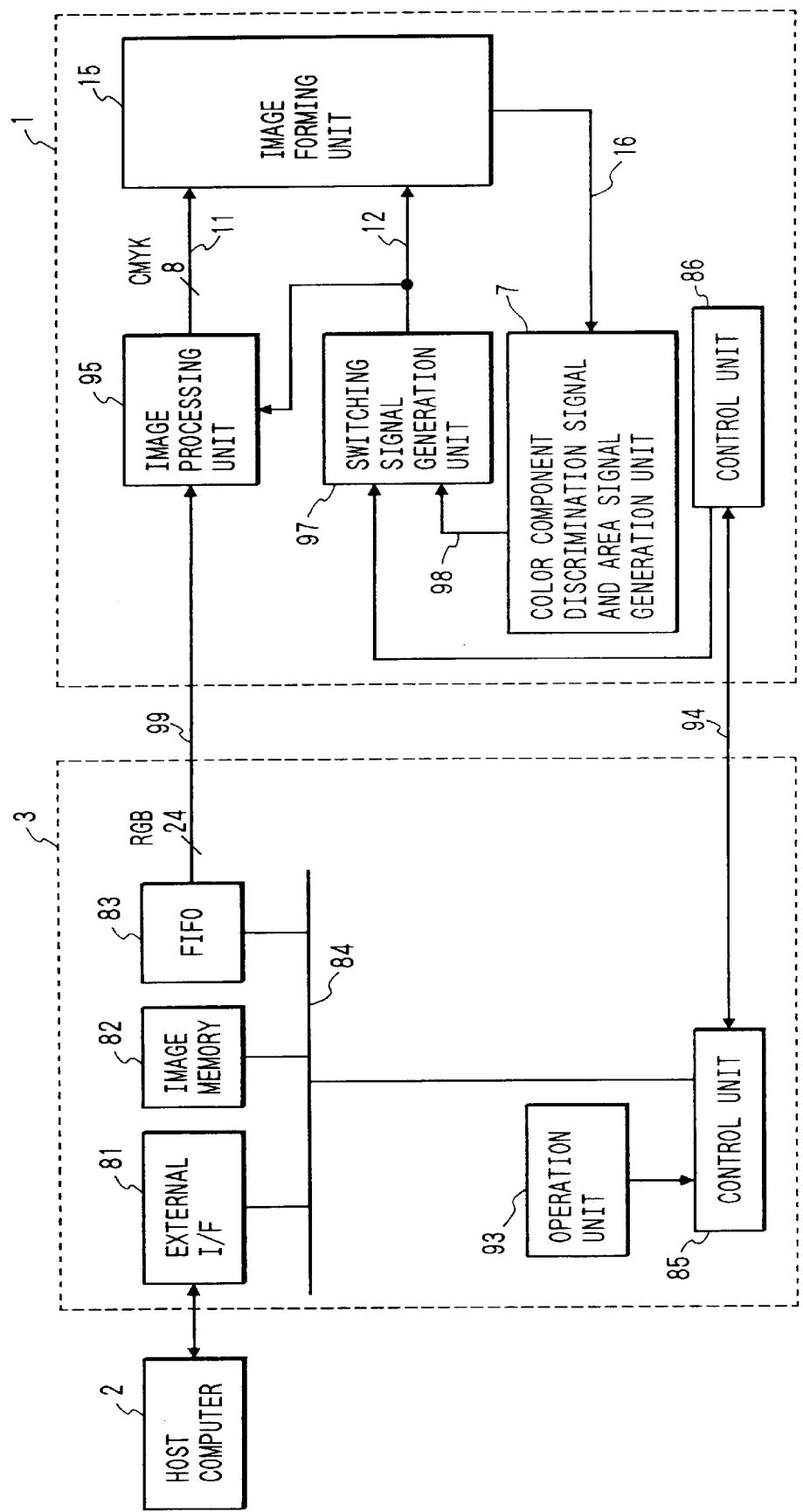
FIG. 10 is a block diagram of an image forming apparatus and an image processing apparatus according to the third embodiment of the present invention.

FIG. 10 is a block diagram showing a controller 3 as an image processing apparatus and an image forming apparatus 1 according to the third embodiment of the present invention. In the second embodiment, the number of lines switching signal indicating the 200 or 400 lines mode is generated by the controller side, and is supplied to the image forming apparatus in the form of a signal. In this embodiment, the number of lines switching information indicating the 200 or 400 lines mode is generated by the controller side, and is supplied in the form of a communication to the image forming apparatus. Thereafter, the information is converted into the form of a signal in the image forming apparatus, thereby switching the modes. Since the number of lines switching information is sent via a communication, the controller side cannot switch the modes in real time in units of pixels or partial areas, but switches the modes in units of pages or color components forming an image for one page.

Since the blocks in FIG. 10 having the same names as those in FIG. 1 or 8 have the same functions as those in the first or second embodiment, a detailed description thereof will be omitted, and only the relationship of blocks will be explained below.

Image data supplied from a host computer 2 is written in an image memory 82 via an external I/F circuit 81. Thereafter, the image forming apparatus 1 is started, and a print operation is started. The image data supplied from the host computer 2 is an image described in, e.g., the PDL (Page Description Language). Thus, a CPU (not shown) in a control unit 85 develops the received image data into raster image data, and writes the raster image data in the image memory 82. In the second embodiment, image data is subjected to image processing using a hardware circuit after it is read out from the FIFO. However, in this embodiment, image data is subjected to image processing in a software manner simultaneously with image development by the CPU.

In a print operation, the raster image data is sequentially read out from the image memory 82, and is written in a FIFO 83. The image data written in the FIFO 83 is read out in synchronism with synchronization signals (not shown) from an image forming unit, and is supplied to the image forming apparatus 1 as image data 99. Unlike in the second embodiment, the image data 99 is RGB 24-bit data.

The control unit 85 communicates with the host computer 2 via the external I/F circuit 81, and also communicates with a control unit 86 of the image forming apparatus 1 via a communication line 94. In addition, the control unit 85 controls the respective units in the image forming apparatus via a CPU bus 84 (partially not shown). In particular, the number of lines switching information is supplied from the control unit 85 to the control unit 86 of the image forming apparatus 1 via the communication line 94 prior to the print operation. An operation unit 93 is used by an operator to set various modes. The operation unit 93 comprises a CRT, a keyboard, and a mouse, and allows the operator to preview the contents of the image memory 82 before a print operation and to designate an area in the image using the mouse while observing the preview image.

The image forming apparatus 1 receives the RGB image signal 99 from an external apparatus and the number of lines switching information via the communication line 94, and performs image formation in accordance with the received information.

An image processing unit 95 performs image processing such as conversion of externally input RGB data into CMYK image data 11. The CMYK image data 11 output from the image processing unit 95 is supplied to an image forming unit 15, and image formation is performed.

A switching signal generation unit 97 is set on the basis of the number of lines switching information sent via the communication line 94, and converts the information into a number of lines switching signal 12. The internal arrangement of the switching signal generation unit 97 is the same as that of the first embodiment. The number of lines switching signal 12 generated by the switching signal generation unit 97 is supplied to the image forming unit 15 in synchronism with the CMYK image data 11. The number of lines switching signal 12 is also supplied to the image processing unit 95, and is used for changing the image processing parameters in accordance with the value of the number of lines switching signal 12 as in the first embodiment.

A color component discrimination signal/area signal generation unit 7 (to be referred to as an area signal generation unit 7 hereinafter) supplies a color component discrimination signal 98-2 and an area signal 98-1 to the switching signal generation unit 97 as in the first embodiment.

The image forming unit 15 is an electrophotographic color printer, which frame-sequentially performs image formation for a plurality of output color components C (Cyan), M (Magenta), Y (Yellow), and K (blacK), and one of C, M, Y, and K data is output from the image processing unit 95 in correspondence with the color component to be subjected to image formation in the unit 15. Therefore, the CMYK image data 11 requires a bus width of 8 bits for one color component. The image forming unit 15 forms an image by two different pulse-width modulation methods, i.e., the 400 and 200 lines modes, as in the first embodiment. In this embodiment, the unit 15 performs image formation by switching the two different pulse-width modulation methods in accordance with the number of lines switching signal 12 obtained by converting the externally input number of lines switching information into a signal by the switching signal generation unit 97.

The internal arrangement of the image forming unit 15 is the same as that of the first embodiment.

Figure 11B:
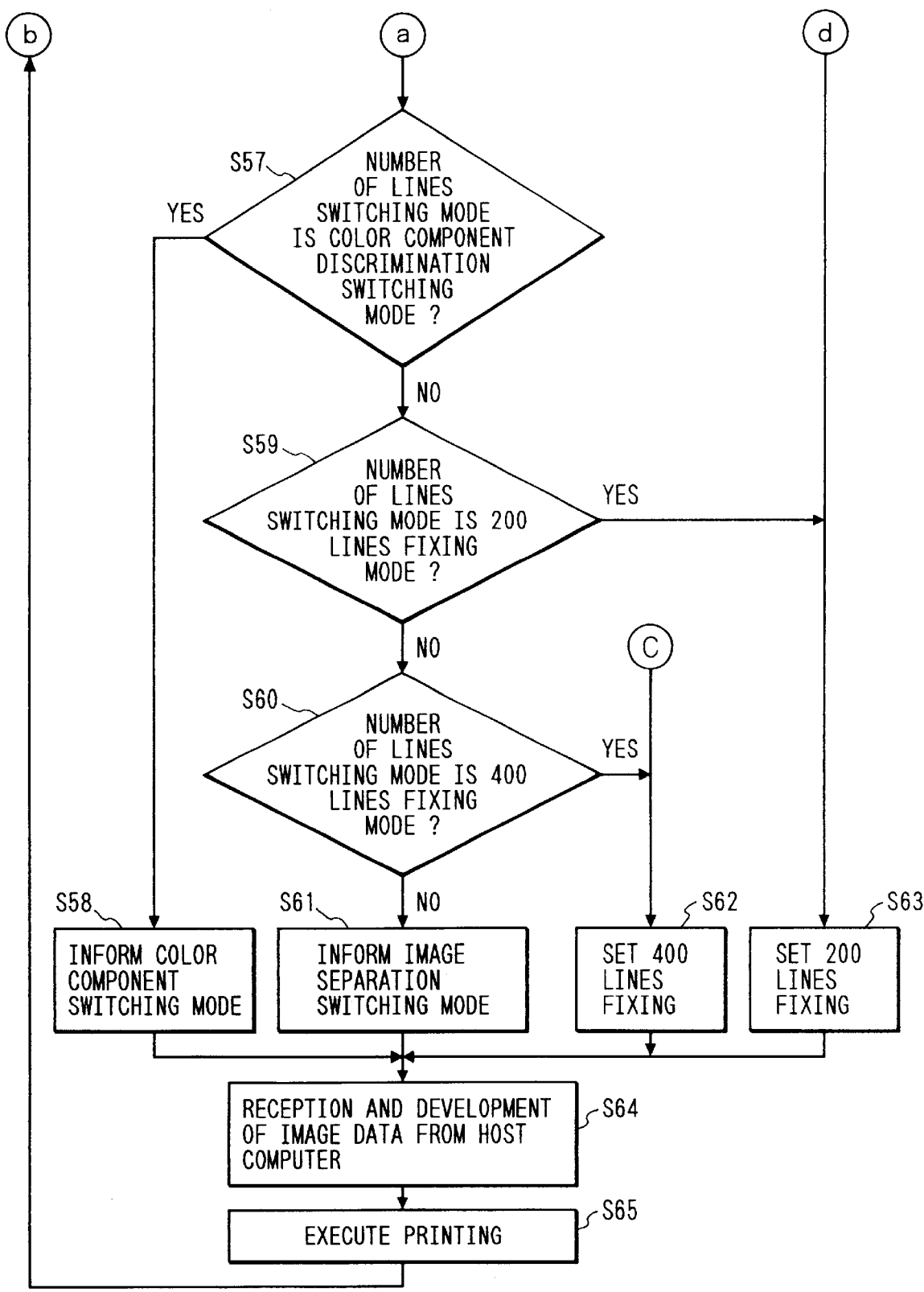
FIG. 11 which is composed of FIGS. 11A and 11B is a flow chart showing the control operation in the third embodiment.

FIGS. 11A and 11B are flow charts for explaining the control on the controller side in this embodiment. In the following description, only differences from the control flow chart of the second embodiment shown in FIGS. 9A and 9B will be explained.

In this embodiment, the number of lines switching mode includes six modes described above in the first and second embodiments.

In the second embodiment, an image mode indicating, e.g., whether image data to be sent to the image forming apparatus is multi-value or binary data is received as a portion of image data supplied from the host computer in step S32 (see FIGS. 9A and 9B). However, in this embodiment, an image mode is received from the host computer independently of image data in step S52. Since image data is received in step S64 after the number of lines switching information is determined, if the image mode is received together with image data, the image mode cannot be used as data for determining the number of lines switching information. For this reason, the image mode is received before determination of the number of lines switching information independently of image data. In the subsequent steps S54 and S56, whether an image signal to be sent to the image forming apparatus is multi-value/binary data, or color/black and white data is determined based on the contents of this image mode.

In the third embodiment, the order of step S64 of receiving image data from the host computer and steps S53 to S63 of determining the number of lines switching information is reversed to that in the second embodiment. Since image data received from the host computer is subjected to image processing in a software manner simultaneously with development onto the image memory 82, the image processing parameters cannot be changed in accordance with the number of lines switching information upon development in step S64 unless the number of lines switching information is determined in steps S53 to S63 beforehand. More specifically, the parameters of the image processing performed upon development are changed in step S64 in accordance with the number of lines switching information determined in steps S53 to S63.

In the third embodiment, in steps S62, S63, and S58, the methods of performing setting operations for the 200 lines fixing mode, the 400 lines fixing mode, and the color component discrimination switching mode are different from those in the second embodiment. In the second embodiment, the number of lines switching signal generation unit in the controller is set, and a signal generated by the unit is sent to the image forming apparatus in the form of a signal. On the other hand, in the third embodiment, the number of lines switching information is discriminated and generated by the control unit of the controller, as shown in the control flow chart in FIGS. 11A and 11B. In this case, the information indicating each mode is supplied to the image forming apparatus 1 via the communication line 94 in step S62, S63, or S58. The number of lines switching information is set in the LUT 31 by the control unit 86 in the image forming apparatus, and is converted into the number of lines switching signal 12 in an actual print operation. Values to be written in the LUT 31 in the respective setting operations are the same as those in the first embodiment.

In the third embodiment, in step S61, the method of performing a setting operation for the image area separation switching mode is different from that in the second embodiment. In the second embodiment, the number of lines switching signal generation unit in the controller is subjected to the setting operation for the image area separation switching mode, and a signal generated by the unit is sent to the image forming apparatus in the form of a signal. On the other hand, in the third embodiment, whether or not the image area separation switching mode is set is determined by the control unit of the controller in accordance with the control flow chart shown in FIGS. 11A and 11B. In this case, image area separation switching mode information is supplied to the image forming apparatus 1 via the communication line 94. The image area separation switching mode information is set in the LUT 31 by the control unit 86 in the image forming apparatus, and is converted into the number of lines switching signal 12 in an actual print operation. In this case, data "2" is written in the LUT 31.

In the third embodiment, in step S64, image data is received from the host computer, and is developed onto the image memory while being subjected to image processing. The image processing includes color correction, and the like, and the parameters of the image processing are changed in accordance with the number of lines switching information determined in steps S53 to S63. In this case, the parameters are not changed when the number of lines switching mode is the image area separation switching mode.

Upon completion of the setting operation for each mode, an actual print operation is performed in step S65, and after the print operation is completed, the flow returns to step S53.

Although no specific explanation is given in the description of the control flow shown in FIGS. 11A and 11B for the sake of simplicity, the number of lines switching mode can be changed depending on areas in this embodiment. More specifically, the color component switching mode set in step S58, the image area separation switching mode set in step S61, the 400 lines fixing mode set in step S62, and the 200 lines fixing mode set in step S63 can be independently designated in units of areas. On the other hand, whether image data to be sent to the image forming apparatus is multi-value or binary data, or color or black and white data can only be determined for the entire image, and the number of lines switching mode that requires such information cannot be switched in units of areas.

In order to use different switching modes in units of areas, in place of inputting the number of lines switching mode from the operation unit in step S51, a plurality of pairs of area information and number of lines switching modes are received upon reception of the image mode from the host computer in step S52. Then, determination of the number of lines switching information and notification processing to the image forming apparatus in steps S53 to S63 are repeated in correspondence with the number of areas. At this time, when notification processing of a given area to the image forming apparatus is performed, the corresponding area information is also sent. Upon reception of the area information and number of lines switching information, the control unit 86 of the image forming apparatus writes the area information in the area signal generation unit 7. Then, the control unit 86 writes the number of lines switching information at only the addresses when the area signal indicates an area code of the corresponding area. On the other hand, in a print operation, since the area code is read out from the area signal generation unit 7 and is supplied to the LUT 31, and the data at the addresses corresponding to the area code is read out, different number of lines switching processing operations can be performed in units of areas. As described above, when area information is received from the host computer, and the number of lines switching mode of each area is designated, desirable designation can be attained from the host computer.

Figure 12:
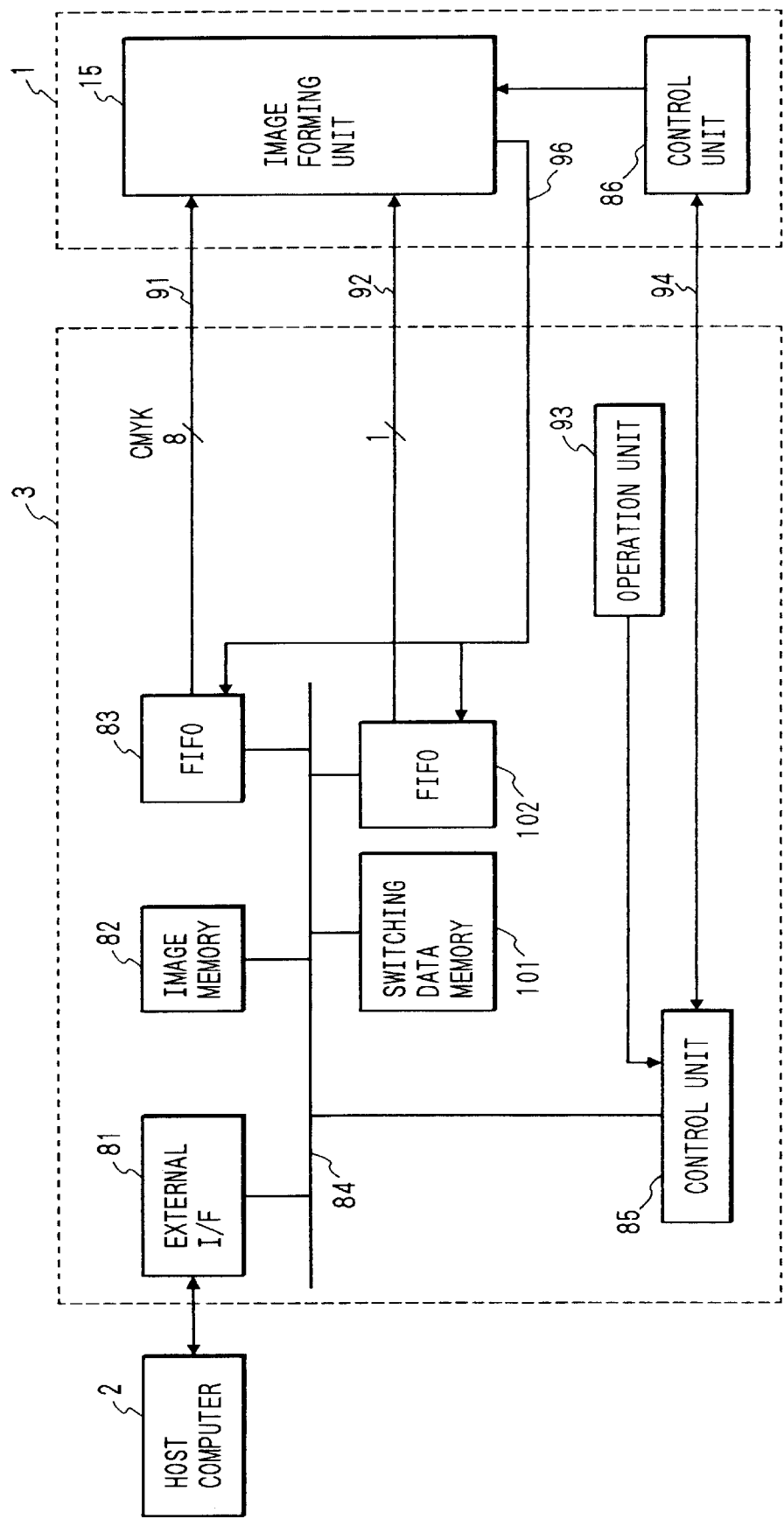
FIG. 12 is a block diagram of an image forming apparatus and an image processing apparatus according to the fourth embodiment of the present invention.

FIG. 12 is a block diagram showing a controller 3 as an image processing apparatus and an image forming apparatus 1 according to the fourth embodiment of the present invention. In the second embodiment, a switching signal is generated by the area signal generation unit 87 and the switching signal generation unit 90 (see FIG. 8). However, in the fourth embodiment, switching data for one page are written in a switching data memory 101, and a switching signal is generated by reading out the written data.

Since the fourth embodiment has an arrangement similar to that of the second embodiment, only differences from the second embodiment will be explained.

The switching data memory 101 is a page memory for holding switching data corresponding to pixels for one page. Simultaneously with development of PDL data onto respective pixels of an image memory 82, it is checked if the pixel of interest is to be formed in the 200 or 400 lines mode, and the discrimination result is written at the corresponding address of the switching data memory 101. In the fourth embodiment, the switching mode can be changed in units of pixels since the switching data memory 101 is arranged so that one switching data (1 bit) corresponds to one pixel. Alternatively, the capacity of the page memory may be reduced by setting one switching data in correspondence with, e.g., 4×4 pixels.

In a print operation, in synchronism with transfer of image data from the image memory 82 to a FIFO 83, the switching data are transferred from the switching data memory 101 to a FIFO 102.

Subsequently, the image data is read out from the FIFO 83 in synchronism with synchronization signals 96 from the image forming apparatus 1, and the switching data are also read out from the FIFO 102 in synchronism with the synchronization signals 96. The readout switching data are supplied to the image forming apparatus 1 as a number of lines switching signal 92.

In the second embodiment, image data is developed onto the image memory 82 in the RGB format. However, in the fourth embodiment, image data is developed in the CMYK format. For this reason, in accordance with one of C, M, Y, and K color components to be subjected to image formation in the image forming apparatus, only an image of the corresponding color component is written in the FIFO 83, and is read out and supplied to the image forming apparatus.

All the image processing operations are performed in a software manner by a CPU (not shown) in a control unit 85.

In this embodiment, the image memory 82 and the switching data memory 101 are described as different memories. However, a single memory may be used for these memories. Also, the FIFOs 83 and 102 are described as different FIFOs. However, a single FIFO memory used for these FIFOs. Furthermore, switching data may be set in a portion of image data. For example, switching data may be assigned to bit 0 of B data of R, G, and B data. This is because B is the complementary color of yellow, and human eye is not sensitive to a change in B. With this arrangement, not only image data and switching data can be systematically processed, but also an extra memory and FIFO for switching data can be omitted. In addition, a signal line 92 for switching data can also be omitted, and the controller of this embodiment can be directly connected to an image forming apparatus which does not cope with such switching data.

Figure 13B:
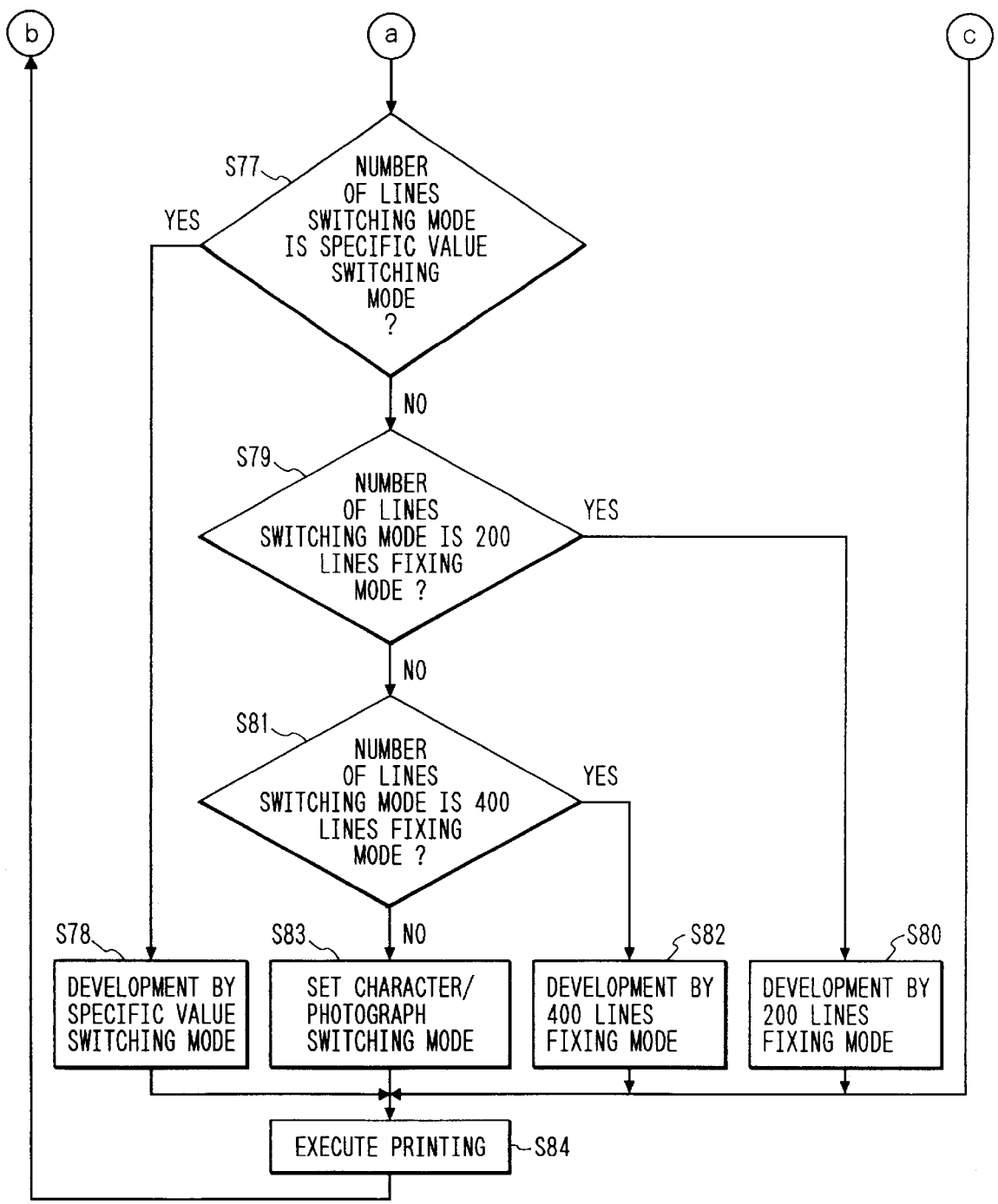
FIG. 13 which is composed of FIGS. 13A and 13B is a flow chart showing the control operation in the fourth embodiment.

FIGS. 13A and 13B are flow charts for explaining the control on the controller side in the fourth embodiment. Since the flow charts in FIGS. 13A and 13B are similar to the control flow charts of the second embodiment shown in FIGS. 9A and 9B, only differences will be mainly described below.

After a power supply switch is turned on, the number of lines switching mode is input from an operation unit 93 of the controller, is input from the host computer, or is input from the image forming apparatus, in step S71. When the mode is input from the host computer 2, command data and the like are received via an external I/F circuit 81. When the mode is input from the image forming apparatus 1, command data and the like are received from a control unit 86 of the image forming apparatus 1 via a communication line 94. In addition, the mode may be input from two or more of these input sources or one of the input sources. Furthermore, the mode may be input from none of these input sources, and if a previously set value is held in a memory backed up by a battery or a hard disk, the held value may be used. Moreover, a default value when no setting operation is performed may be used. For the sake of simplicity, the mode is input immediately after the power supply switch is turned on. However, the input timing is not particularly limited as long as the image forming apparatus is in operation.

In the fourth embodiment, the number of lines switching mode includes the following six modes.

1) Multi-value/binary Switching Mode

In this mode, it is checked in units of partial areas of image data to be sent to the image forming apparatus if an image included in the area of interest is a multi-value or binary image, and if the image is a multi-value image, the image is formed in the 200 lines mode; if the image is a binary image, the image is formed in the 400 lines mode.

2) Color/black and White Switching Mode

In this mode, it is checked in units of partial areas of image data to be sent to the image forming apparatus if an image included in the area of interest is a color or black and white image, and if the image is a color image, the image is formed in the 200 lines mode; if the image is a black and white image, the image is formed in the 400 lines mode.

3) Specific Value Switching Mode

In this mode, it is checked in units of partial areas of image data to be sent to the image forming apparatus if an image included in the area of interest has a specific value, and if the image has a specific value, the image is formed in the 400 lines mode; otherwise, the image is formed in the 200 lines mode.

4) 200 Lines Fixing Mode

In this mode, the 200 lines mode is fixed in image formation.

5) 400 Lines Fixing Mode

In this mode, the 400 lines mode is fixed in image formation.

6) Character/photograph Switching Mode

In this mode, it is checked in units of partial areas of image data to be sent to the image forming apparatus if an image included in the area of interest is a character or photograph image. In accordance with the discrimination result, a character area is formed in the 400 lines mode, and a photograph area is formed in the 200 lines mode.

In the fourth embodiment, the above-mentioned six number of lines switching modes are prepared, and one of these modes is selected from the operation unit 93, the host computer 2, or the image forming apparatus 1. Alternatively, an arrangement having some of these six number of lines switching modes or only one of these modes may be adopted. When only one mode is available, no selection need be performed from the operation unit or the like, as a matter of course.

After the number of lines switching mode is input in step S71 in FIG. 13A, image data is received from the host computer in step S72. In this embodiment, the image data is merely received but is not developed onto the image memory 82 at that time. Upon completion of reception of image data for one page, the flow advances to step S73 to check if the number of lines switching mode is the multi-value/binary switching mode. If YES in step S73, the flow advances to step S74, and image development is performed in the multi-value/binary switching mode. More specifically, during development of a given pixel, if image data of the pixel to be developed is multi-value data, "0" (200 lines) is written at the corresponding address of the switching data memory; if the image data of the pixel to be developed is binary data, "1" (400 lines) is written at the corresponding address of the switching data memory. Whether or not the image data of the pixel to be developed is binary data is discriminated based on PDL data itself. For example, if PDL data to be developed is binary raster image data, "1" (400 lines) is written at the corresponding addresses of the switching data memory during the development of the data. In this case, all image data which are not determined as binary data are determined as multi-value data.

In the fourth embodiment, the switching data memory is set depending on whether or not image data of the pixel to be developed is binary data. Alternatively, as another embodiment, if the number of effective bits of the pixel to be developed is larger than a predetermined value, the image is formed in the 200 lines mode; otherwise, the image is formed in the 400 lines mode, as in the first embodiment. For example, if PDL data to be developed is raster image data having 4 bits or less per pixel, "1" (400 lines) is written at the corresponding addresses during the development of the data.

If it is determined in step S73 that the number of lines switching mode is not the multi-value/binary switching mode, the flow advances to step S75 to check if the number of lines switching mode is the color/black and white switching mode. If YES in step S75, the flow advances to step S76 and image development is performed in the color/black and white switching mode. More specifically, during development of a given pixel, if image data of the pixel to be developed is color data, "0" (200 lines) is written at the corresponding address of the switching data memory; if the image data of the pixel to be developed is black and white data, "1" (400 lines) is written at the corresponding address of the switching data memory. Whether or not the image data of the pixel to be developed is black and white data is discriminated based on PDL data itself.

For example, during development of a character, if the color of the character is designated in the black and white mode or if R=G=B even when the color is designated in the RGB mode, the data is determined as black and white data. In this case, all data which are not determined as black and white data are determined as color data.

If it is determined in step S75 that the number of lines switching mode is not the color/black and white switching mode, the flow advances to step S77 to check if the number of lines switching mode is the specific value switching mode. If YES in step S77, the flow advances to step S78, and image development is performed in the specific value switching mode. More specifically, during development of a given pixel, if image data of the pixel to be developed has a specific value, "1" (400 lines) is written at the corresponding address of the switching data memory; if the image data of the pixel to be developed has a value other than the specific value, "0" (200 lines) is written at the corresponding address of the switching data memory.

If it is determined in step S77 that the number of lines switching mode is not the specific value switching mode, it is checked in step S79 and S81 if the number of lines switching mode is the 200 or 400 lines fixing mode.

If it is determined in step S79 that the number of lines switching mode is the 200 lines fixing mode, the flow advances to step S80, and a setting operation of the 200 lines fixing mode is performed. More specifically, "0" is written at all the addresses of the switching data memory. On the other hand, if it is determined in step S81 that the number of lines switching mode is the 400 lines fixing mode, the flow advances to step S82, and a setting operation of the 400 lines fixing mode is performed. More specifically, "1" is written at all the addresses of the switching data memory.

If the number of lines switching mode is neither the 200 lines fixing mode nor the 400 lines fixing mode, since the remaining mode is the character/photograph switching mode, a setting operation for the character/photograph switching mode is performed in step S83. More specifically, during development of a given pixel, if image data of the pixel to be developed is character or line data, a character area is determined, and "1" (400 lines) is written at the corresponding address of the switching data memory; if image data of the pixel to be developed is other data, a photograph area is determined, and "0" (200 lines) is written at the corresponding address of the switching data memory.

In general, PDL data is constituted by 1) a description using character data, 2) a description using figure data such as straight lines, curves, rectangles, and the like, and 3) a description using raster image data. Therefore, the description to which PDL data to be developed belongs can be determined by a CPU (not shown) which performs development, and the value to be written in the switching data memory is changed in accordance with the information determined by the CPU. For example, while a series of character data are developed, "1"s are continuously written at the corresponding addresses of the switching data memory. On the other hand, while a series of raster image data are developed, "0"s are continuously written at the corresponding addresses of the switching data memory.

In this embodiment, an area determined as a character area is formed in the 400 lines mode. Alternatively, as another embodiment, only the edge portion of a character may be formed in the 400 lines mode. Whether or not data to be formed corresponds to an edge portion is discriminated during development of character data in PDL data. In particular, when the character data is described using an outline font, an edge portion is discriminated based on the outline data. Only pixels determined as an edge portion of the character portion are formed in the 400 lines mode, and other pixels are formed in the 200 lines mode.

Upon completion of the setting operation for each mode, as described above, an actual print operation is performed in step S84, and after the print operation is completed, the flow returns to step S72.

In the fourth embodiment, after image data for one page is received, development is performed. Alternatively, image data may be received and developed little by little.

The present invention may be practiced in various other forms without departing from the spirit or principal features of the invention.

For example, in each of the above embodiments, a method of performing pulse-width modulation in units of pixels is used as the first modulation method, and a method of performing pulse-width modulation in units of 1.5 pixels is used as the second modulation method. In this case, it is important to selectively use two modulation methods having different image characteristics, and the present invention is not limited to the above two different modulation methods. For example, a method of performing pulse-width modulation in units of pixels may be used as the first modulation method, and a method of performing pulse-width modulation in units of 3 or 4 pixels may be used as the second modulation method. Even when the method of performing pulse-width modulation in units of 2 pixels is used as the first modulation method, and the method of performing pulse-width modulation in units of 4 pixels is used as the second modulation method, this falls within the scope of the invention.

In each of the above embodiments, the two different modulation methods are selectively used. Alternatively, a case wherein three or more different modulation methods are selectively used does not fall outside the scope of the present invention. For example, a method of performing pulse-width modulation in units of pixels may be used as the first modulation method, a method of performing pulse-width modulation in units of 2 pixels may be used as the second modulation method, a method of performing pulse-width modulation in units of 4 pixels may be used as the third modulation method, and these methods may be selectively used.

In place of the pulse-width modulation, a case wherein the laser intensity is modulated does not fall outside the scope of the present invention. For example, the present invention may be applied to a case wherein a method of modulating the laser intensity in units of pixels may be used as the first modulation method, and a method of modulating the laser intensity in units of two pixels may be used as the second modulation method. In addition, a case wherein the voltage to be applied to a piezoelectric element used for ejecting ink in an ink-jet printer, the voltage to be applied to a heater used for ejecting ink in a bubble-jet printer, the voltage to be applied to a heater used for generating heat in a thermal printer, or the like is modulated does not fall outside the scope of the present invention.

In each of the above embodiments, the two modulation methods having different image characteristics are selectively used depending on various conditions. In addition to the conditions described in the above embodiments, it may be discriminated if image data to be printed includes character data, and the modulation methods may be selectively used in accordance with the discrimination result. This case does not fall outside the scope of the present invention, either.

In each of the above embodiments, image data is received from, e.g., the external host computer via a communication. Alternatively, image data may be read out from an internal floppy disk. A hard disk may replace the floppy disk, or image data created by an application program (not shown) may be transferred on a main memory.

In each of the above embodiments, the electrophotographic color printer is assumed as the image forming unit. Alternatively, an ink-jet printer, a thermal printer, or the like may be used as long as they are image forming apparatuses having a plurality of modulation methods.

In each of the above embodiments, image data is transferred using a so-called video I/F, which transfers image data in synchronism with synchronization signals, as an I/F between the controller and the image forming apparatus. Alternatively, an image may be transferred using a versatile interface such as a GPIB interface, SCSI interface, or the like. The versatile interface is also used when a print start command and the like are sent from the controller to the image forming apparatus. At this time, since the transfer speed of the versatile interface is generally lower than the formation speed of the image forming apparatus, the image forming apparatus must have an image memory for speed conversion.

In each of the above embodiments, the image forming unit, the scanner, and the like in the image forming apparatus are integrally arranged, but may be arranged as different devices.

In each of the above embodiments, the controller 3 and the image forming apparatus 1 are described as different apparatuses. However, these apparatuses may be built in a single apparatus. Also, the controller 3 and the host computer 2 are described as different apparatuses. However, these apparatuses may also be built in a single apparatus.

In other words, the foregoing description of embodiments has been given for illustrative purposes only and not to be considered as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   (a) externally-inputting means for inputting into said image processing apparatus both image data and feature data representing a feature of the inputted image data, wherein both are outputted from an external apparatus;
   (b) discrimination means for discriminating a recording density change mode which is set from a plurality of kinds of recording density change modes;
   (c) generation means for determining a recording density for formation of an image of the inputted image data according to the recording density change mode discriminated by said discrimination means and the inputted feature data and generating control data indicating the determined recording density; and
   (d) image forming means for forming an image according to the control data generated by said generation means and the inputted image data.

2. An apparatus according to claim 1, wherein the plurality of kinds of recording density change modes include at least a mode for changing a recording density according to whether or not the image data is character image data.

3. An apparatus according to claim 1, wherein the plurality of kinds of recording density change modes include at least a mode for changing a recording density according to whether or not the image data is photograph image data.

4. An apparatus according to claim 1, wherein the plurality of kinds of recording density change modes include at least a mode for changing a recording density according to whether or not the image data is monochromatic image data.

5. An apparatus according to claim 1, wherein the plurality of kinds of recording density change modes include at least a mode for changing a recording density according to whether or not the image data is color image data.

6. An apparatus according to claim 1, wherein the plurality of kinds of recording density change modes include at least a mode for changing a recording density according to a density value of the image data.

7. An apparatus according to claim 1, wherein the plurality of kinds of recording density change mode include at least a mode for changing a recording density according to a number of colors which the image data represents.

8. An apparatus according to claim 1, wherein the plurality of kinds of recording density change modes include at least a mode for changing a recording density according to a number of gradations which the image data represents.

9. An apparatus according to claim 1, further comprising setting means for setting the recording density change mode according to a designation signal from said external apparatus.

10. An apparatus according to claim 1, wherein said image forming means includes pulse width modulation means for pulse-width modulating the image data by using a pattern signal of a predetermined period, and wherein said pulse width modulation means selects one of a first pulse-width modulated signal which is pulse-width modulated by using a first pattern signal, and a second pulse-width modulated signal which is pulse-width modulated by using a pattern signal whose period is different from that of the first pattern signal.

11. An apparatus according to claim 1, wherein said image forming means forms the image with an electrophotography method.

12. An apparatus according to claim 1, wherein the feature data is data which indicates whether the image data is binary data or multi-value data.

13. An apparatus according to claim 1, wherein the feature data is data which indicates whether the image data is monochromatic image data or color image data.

14. An apparatus according to claim 1, wherein the feature data is data which indicates a number of colors which the image data represents.

15. An image processing apparatus comprising:
   (a) externally-inputting means for inputting into said image processing apparatus both image data and feature data representing a feature of the inputted image data, wherein both are outputted from an external apparatus;
   (b) discrimination means for discriminating a recording density change mode which is set from a plurality of kinds of recording density change modes;
   (c) generation means for determining a recording density for formation of an image of the inputted image data according to the recording density change mode discriminated by said discrimination means and the inputted feature data and generating control data indicating the determined recording density; and
   (d) externally-outputting means for outputting the control data generated by said generation means and the inputted image data to an external image forming apparatus.

16. An apparatus according to claim 15, wherein the plurality of kinds of recording density change modes include at least a mode for changing a recording density according to whether or not the image data is character image data.

17. An apparatus according to claim 15, wherein the plurality of kinds of recording density change modes include at least a mode for changing a recording density according to whether or not the image data is photograph image data.

18. An apparatus according to claim 15, wherein the plurality of kinds of recording density change modes include at least a mode for changing a recording density according to whether or not the image data is monochromatic image data.

19. An apparatus according to claim 15, wherein the plurality of kinds of recording density change modes include at least a mode for changing a recording density according to whether or not the image data is color image data.

20. An apparatus according to claim 15, wherein the plurality of kinds of recording density change modes include at least a mode for changing a recording density according to a density value of the image data.

21. An apparatus according to claim 15, wherein the plurality of kinds of recording density change modes include at least a mode for changing a recording density according to a number of colors which the image data represents.

22. An apparatus according to claim 15, wherein the plurality of kinds of recording density change modes include at least a mode for changing a recording density according to a number of gradations which the image data represents.

23. An apparatus according to claim 15, further comprising setting means for setting the recording density change mode according to a designation signal external apparatus.

24. An apparatus according to claim 15, wherein said external image forming means includes pulse width modulation means for pulse-width modulating the image data by using a pattern signal of a predetermined period, and wherein said pulse width modulation means selects one of a first pulse-width modulated signal which is pulse-width modulated by using a first pattern signal, and a second pulse-width modulated signal which is pulse-width modulated by using a pattern signal whose period is different from that of the first pattern signal.

25. An apparatus according to claim 15, wherein the feature data is data which indicates whether the image data is binary data or multi-value data.

26. An apparatus according to claim 15, wherein the feature data is data which indicates whether the image data is monochromatic image data or color image data.

27. An apparatus according to claim 15, wherein the feature data is data which indicates a number of colors which the image data represents.

28. An apparatus according to claim 15, wherein the image data input by said externally-inputting means is page description language (PDL) data, and wherein said externally-inputting means includes developing means for developing the PDL data.

29. An apparatus according to claim 15, wherein said externally-outputting means outputs the image data and the control data to said external image forming means through separate communication lines respectively.

30. An image processing method for an image processing apparatus comprising:
  (a) an externally-inputting step, of inputting into said image processing apparatus both image data and feature data representing a feature of the inputted image data, wherein both are outputted from an external apparatus;
  (b) a discrimination step, of discriminating a recording density change mode which is set from a plurality of kinds of recording density change modes;
  (c) a generation step, of determining a recording density for formation of an image of the inputted image data according to the recording density change mode discriminated in said discrimination step and the feature data and generating control data indicating the determined recording density; and
  (d) an image forming step, of forming an image according to the control data generated in said generation step and the inputted image data.

31. An image processing method for an image processing apparatus, comprising:
  (a) an externally-inputting step, of inputting into the image processing apparatus both image data and feature data representing a feature of the inputted image data, wherein both are outputted from an external apparatus;
  (b) a discriminating step, of discriminating a recording density change mode which is set from a plurality of kinds of recording density change modes;
  (c) a generation steps, of determining a recording density for formation of an image of the inputted image data according to the recording density change mode discriminated in said discrimination step and the inputted feature data and generating control data indicating the determined recording density; and
  (d) an externally-outputting step, of outputting the control data generated in said generation step and the inputted image data to an external image forming apparatus.

* * * * *

UNITED STATES PATENT AND TRADEMARK OFFICE
CERTIFICATE OF CORRECTION

PATENT NO. : 6,674,547 B1　　　　　　　　　　　　　　　　　　　　Page 1 of 1
DATED : January 6, 2004
INVENTOR(S) : Toshihiro Kadowaki It is certified that error appears in the above-identified patent and that said Letters Patent is hereby corrected as shown below:

<u>Title page,</u>
Item [56], References Cited, FOREIGN PATENT DOCUMENTS,
"EP 0411911 A2 2/1991　G06F/15/68" should be deleted.
"04320864" should read -- 4-320864 --.
"04325264" should read -- 4-325264 --.

<u>Column 7,</u>
Line 51, "in,the" should read -- in the --.

<u>Column 10,</u>
Line 57, "and," should read -- and --.

<u>Column 19,</u>
Line 65, "data." should read -- data --.

<u>Column 32,</u>
Line 32, "steps," should read -- step, --.

Signed and Sealed this

Fourth Day of April, 2006

JON W. DUDAS
*Director of the United States Patent and Trademark Office*